US011820596B2

(12) United States Patent
Valinsky et al.

(10) Patent No.: US 11,820,596 B2
(45) Date of Patent: Nov. 21, 2023

(54) AUTOMATED STORAGE AND RETRIEVAL SYSTEM

(71) Applicant: Opex Corporation, Moorestown, NJ (US)

(72) Inventors: Joseph Valinsky, Moorestown, NJ (US); Robert R. DeWitt, Marlton, NJ (US); Alexander Stevens, Philadelphia, PA (US); Dhruva Kumar, Narbeth, PA (US)

(73) Assignee: OPEX Corporation, Moorestown, NJ (US)

( * ) Notice: Subject to any disclaimer, the term of this patent is extended or adjusted under 35 U.S.C. 154(b) by 198 days.

(21) Appl. No.: 17/150,750

(22) Filed: Jan. 15, 2021

(65) Prior Publication Data

US 2021/0139241 A1 May 13, 2021

Related U.S. Application Data

(63) Continuation of application No. 15/905,810, filed on Feb. 26, 2018, now Pat. No. 10,940,998.
(Continued)

(51) Int. Cl.
*G06F 7/00* (2006.01)
*B65G 1/137* (2006.01)
(Continued)

(52) U.S. Cl.
CPC ......... *B65G 1/1373* (2013.01); *B65G 1/0435* (2013.01); *B65G 1/10* (2013.01);
(Continued)

(58) Field of Classification Search
CPC ...... B65G 1/1373; B65G 1/0435; B65G 1/10; B65G 2814/0347; B65G 2814/0352; B65G 1/0492; B65G 2201/0235
(Continued)

(56) References Cited

U.S. PATENT DOCUMENTS 3,547,282 A 12/1970 Harbauer
7,861,844 B2 1/2011 Hayduchok et al.
(Continued)

FOREIGN PATENT DOCUMENTS

DE 2223561 1/1974
DE 3805712 9/1989
(Continued)

OTHER PUBLICATIONS

International Search Report issued in Application No. PCT/US18/019789 dated May 29, 2018.
(Continued)

*Primary Examiner* — Yolanda R Cumbess
(74) *Attorney, Agent, or Firm* — Stephen Eland

(57) ABSTRACT

A method and apparatus are provided for storing or retrieving items to/from a plurality of destinations areas. The items are loaded onto one of a plurality of independently controlled delivery vehicles. The delivery vehicles follow a path to/from the destination areas that are positioned along the path. The destination areas are configured such that the destination areas have a depth to accommodate a plurality of containers in a horizontal line one behind another. The containers may be releasable interconnected so that retrieving one of the interconnected containers displaces one or more connected containers.

18 Claims, 13 Drawing Sheets

Related U.S. Application Data

(60) Provisional application No. 62/463,352, filed on Feb. 24, 2017.

(51) Int. Cl.
  *B65G 1/04* (2006.01)
  *B65G 1/10* (2006.01)

(52) U.S. Cl.
  CPC .............. *B65G 2814/0347* (2013.01); *B65G 2814/0352* (2013.01)

(58) Field of Classification Search
  USPC .......................................... 700/213–216, 218
  See application file for complete search history.

(56) References Cited

U.S. PATENT DOCUMENTS

| | | | |
|---|---|---|---|
| 8,104,601 | B2 | 1/2012 | Hayduchok et al. |
| 8,276,740 | B2 | 10/2012 | Hayduchok et al. |
| 8,417,373 | B2 | 9/2013 | Clo' |
| 8,622,194 | B2 | 1/2014 | DeWitt et al. |
| 9,010,517 | B2 | 4/2015 | Hayduchok et al. |
| 9,334,116 | B2 | 5/2016 | DeWitt et al. |
| 9,687,833 | B2 | 6/2017 | Kanaya et al. |
| 9,815,625 | B2 | 11/2017 | DeWitt et al. |
| 10,052,661 | B2 | 8/2018 | Hayduchok et al. |
| 10,071,857 | B2 | 9/2018 | DeWitt et al. |
| 10,457,483 | B2 | 10/2019 | DeWitt et al. |
| 10,633,186 | B2 | 4/2020 | Valinsky et al. |
| 10,759,601 | B2 | 9/2020 | Valinsky et al. |
| 10,940,998 | B2 | 3/2021 | Valinsky et al. |
| 2002/0037208 | A1 | 3/2002 | Donato |
| 2006/0099055 | A1 | 11/2006 | Stefani |
| 2009/0074545 | A1 | 3/2009 | Lert, Jr. |
| 2015/0197397 | A1 | 7/2015 | Razumov |
| 2017/0166356 | A1* | 6/2017 | Tubilla Kuri ........ B65D 25/282 |
| 2018/0194548 | A1* | 7/2018 | Helou, Jr. ................. B64C 1/22 |

FOREIGN PATENT DOCUMENTS

| | | |
|---|---|---|
| DE | 102006049411 | 4/2008 |
| DE | 102008010060 | 9/2009 |
| DE | 202010003476 | 7/2011 |
| DE | 102012107176 | 2/2014 |
| EP | 126431 | 11/1984 |
| EP | 1193195 | 4/2002 |
| EP | 1193195 A | 4/2002 |
| EP | 2199248 | 6/2010 |
| JP | S61150908 | 7/1986 |
| JP | 2006-290594 | 10/2006 |
| JP | 2015-522492 | 8/2015 |
| JP | 2016-522492 | 8/2015 |
| WO | 2013155107 | 10/2013 |
| WO | 2015007514 | 1/2015 |
| WO | 2016172253 | 10/2016 |
| WO | 2016199033 | 12/2016 |

OTHER PUBLICATIONS

Examination Report from India issued in Application No. 201917030585 dated Sep. 1, 2021.
Examination Report from China issued in Application No. 20201126798.2 dated Jul. 21, 2021.
Examination Report issued in Japan for Application No. 2019-546017 dated Sep. 28, 2021.
Examination Report issued in Japan for Application No. 2019-546008 dated Sep. 28, 2021.
Examination Report issued in Europe for Application No. 18710957.4 dated Oct. 26, 2022.
Examination Report issued in Korea for Application No. 10-2019-7927854 dated Nov. 29, 2022.
Exam Report issued in China for Application No. 202111207108.4 dated Feb. 24, 2023.
Exam Report issued in Australia for Application No. 2018224297 dated Mar. 28, 2023.

* cited by examiner

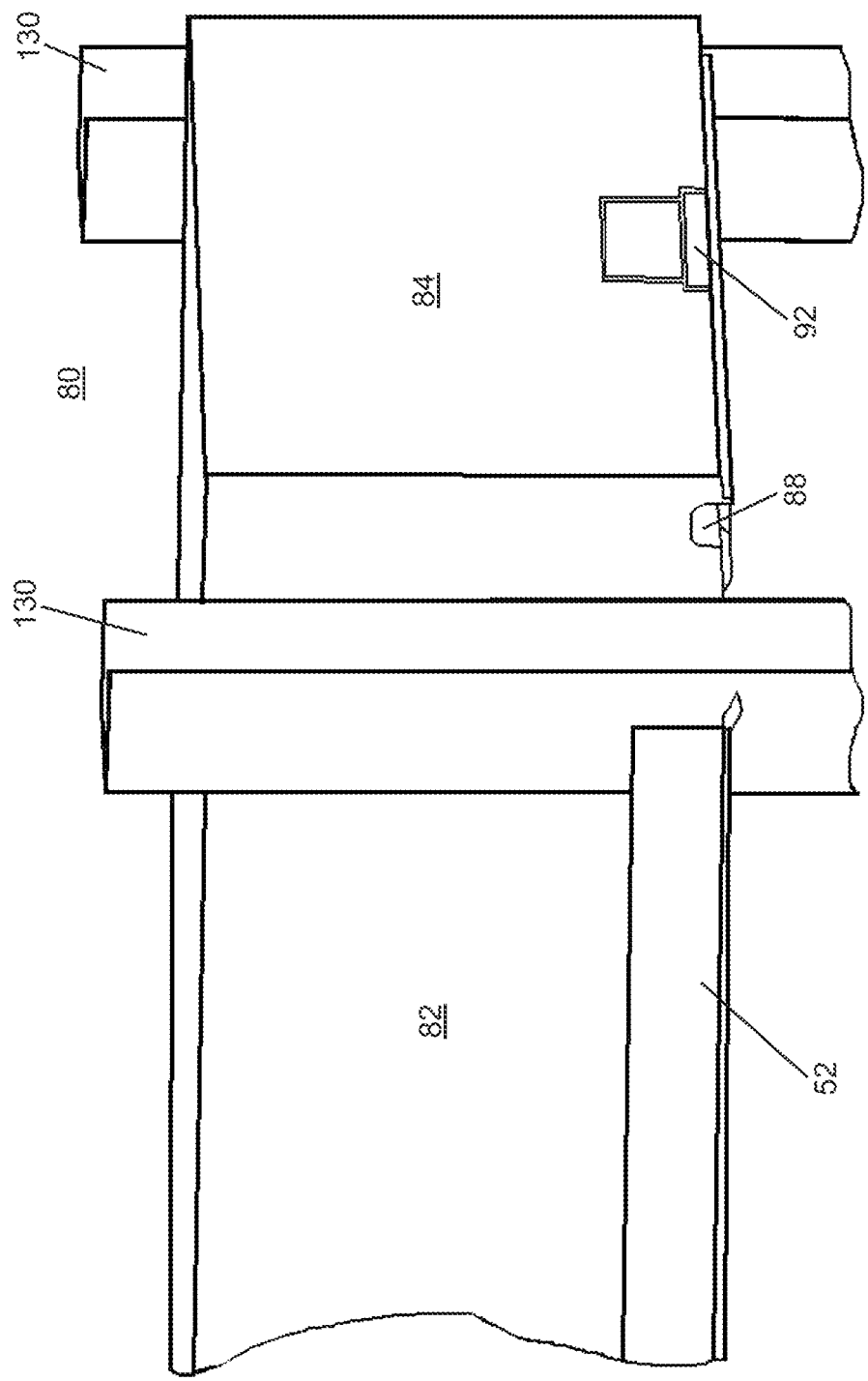

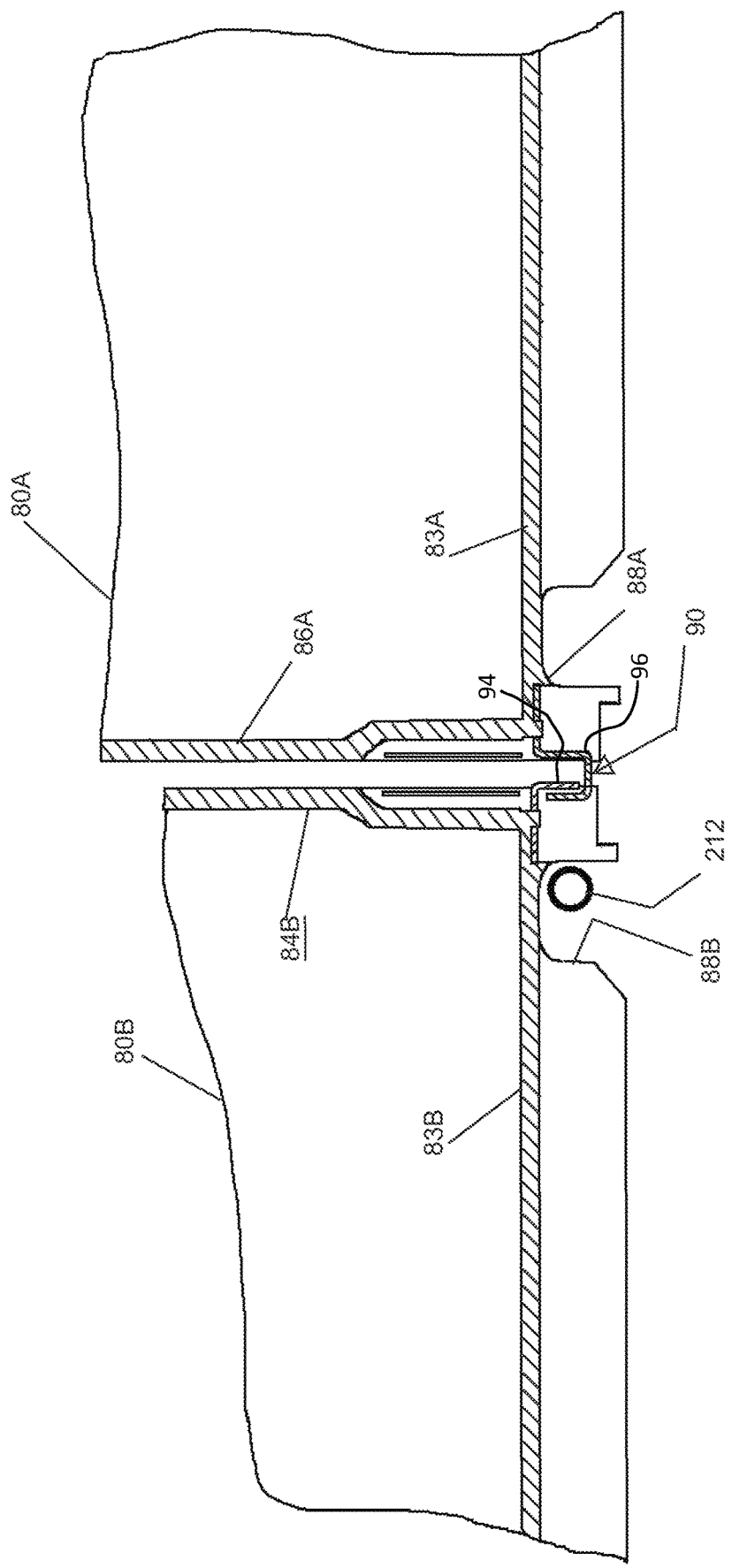

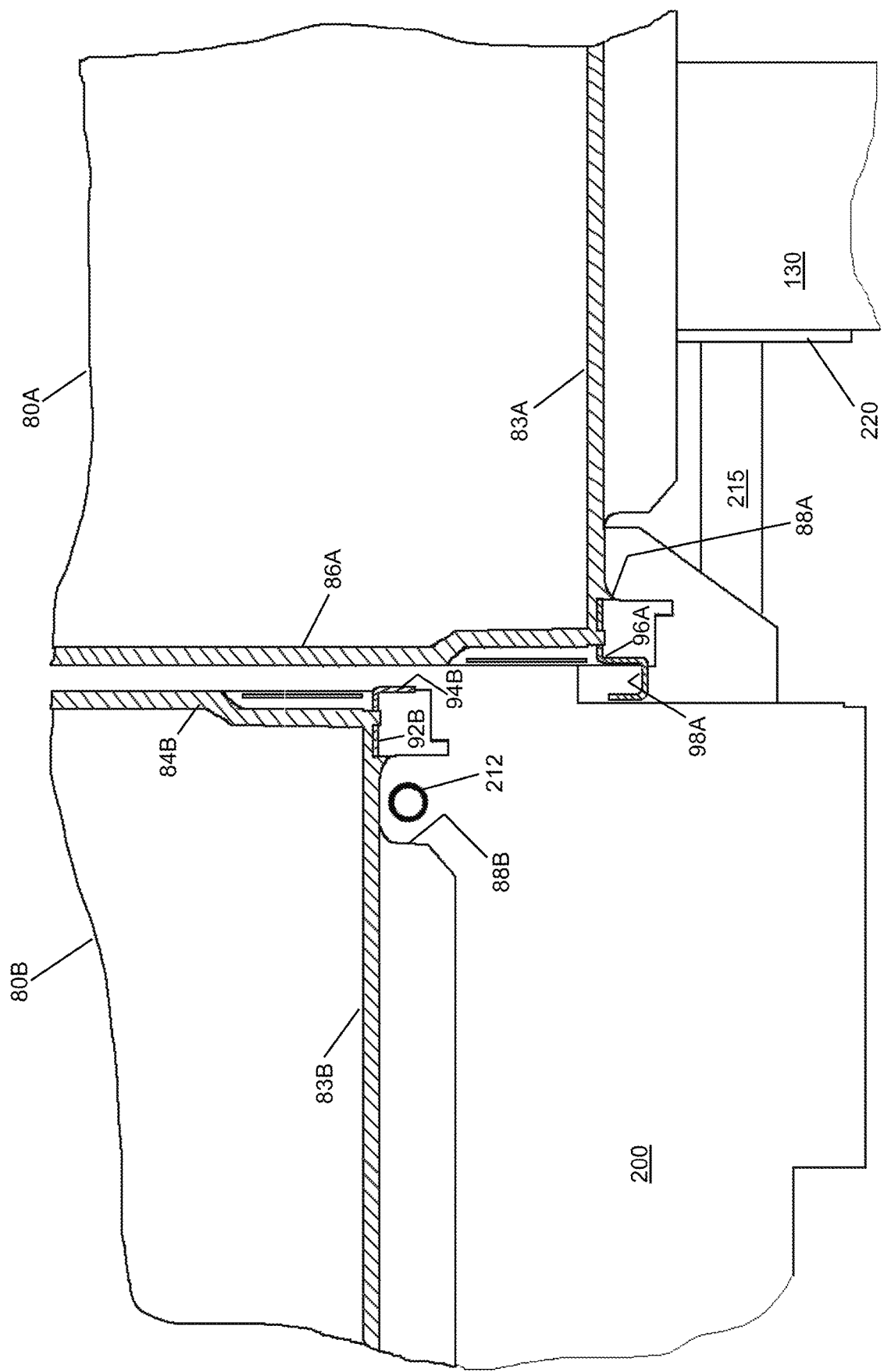

AUTOMATED STORAGE AND RETRIEVAL SYSTEM

PRIORITY CLAIM

This application is a continuation of co-pending U.S. patent application Ser. No. 15/905,810 filed on Feb. 26, 2018, which claims priority to U.S. Provisional Patent Application No. 62/463,352 filed on Feb. 24, 2017. The entire disclosure of each of the foregoing applications is hereby incorporated herein by reference.

TECHNICAL FIELD

This disclosure relates to material handling systems for conveying one or more objects from a first location to a second location and, more particularly, to automated storage and retrieval systems in which a plurality of containers are stored in a plurality of storage locations in which some containers are behind other storage containers.

BACKGROUND

Many large organizations have extensive storage areas in which numerous and diverse items are stored and/or from which they are retrieved, for example, to fill customer orders. Storing items into and retrieving the items from the hundreds or thousands of storage areas requires significant labor to perform manually. In many fields, automated picking has developed to reduce labor cost and improve customer service by reducing the time it takes to fill a customer order. Frequently, there is a trade-off between several variables in setting up a system, such as storage density, accessibility, footprint, cost, just to name a few. For instance, increasing storage density in an automated storage and retrieval (ASR) system can reduce both the cost and the space requirements ("footprint") for such a system. If the storage density of an ASR system is too high, however, the reduced ease and speed with which individual items can be stored and retrieved may render the system unsuitable for many applications.

By way of illustrative example, some ASR systems utilize a conveying system that includes a plurality of independently operated vehicles. Such a system may be configured as an aisle with storage locations on either side of the aisle and the vehicles travelling along a path within the aisle. The capacity of the system can be increased by making the aisle taller or longer. Alternatively, additional aisles may be added. However, in many situations, either the space may not be available for such as system or the cost may exceed the benefit of the increased capacity. Accordingly, in some applications there exists a need for an ASR system with that increases the storage density at a lower cost and in a smaller foot print, without significantly affecting throughput of the system.

SUMMARY OF THE DISCLOSURE

In light of the foregoing, a system provides a method and apparatus for storing and retrieving items. The system includes a plurality of storage locations or destination areas, and a plurality of delivery vehicles for delivering items to or retrieving items from the destination areas. The delivery vehicles follow paths to the destination areas.

The present invention may also provide an improved material handling system in which storage containers in which independently operable vehicles are operable to deliver storage containers into and retrieve storage containers from storage locations having sufficient depth to accommodate multiple storage containers in a horizontal orientation with one storage container positioned behind another. The system may include a track for guiding the vehicles along the track to the storage locations. Additionally, the storage locations may be arranged so that the storage locations are vertically separated from one another. For example, the storage locations may be configured as an array of storage locations in a plurality of rows or columns. The storage containers may also be releasably connectable with adjacent storage containers so that displacement of a first storage container in a first storage location displaces a second storage container within the first storage location.

The present invention also provides a material handling system for storing or retrieving a plurality of items that includes a plurality of independently operable vehicles for delivering and retrieving items to a destination. Optionally, the system includes a track for guiding the vehicles. The system includes a plurality of storage locations wherein a plurality of the storage locations are vertically spaced apart from one another. The storage locations may be positioned along the track is the system includes a track. The system also includes a plurality of storage containers. One or more of the storage locations are configured to receive a plurality of the storage containers. The storage containers include connectors for interconnecting connecting storage containers stored adjacent one another in a storage location. The connectors connect the storage containers so that displacement of one of the containers in a storage location discloses the interconnected container or containers in the same storage location. The vehicles may include a transfer mechanism configured to transfer storage containers between the vehicle and storage locations. The transfer mechanism may be operable to displace first and second interconnected containers when the first or second container is displaced relative to the vehicle.

According to another aspect the material handling system may include a track system having a plurality of generally horizontal track sections spaced apart from one another. The track system may also include a plurality of generally vertical track sections spaced apart from one another. The vertical and horizontal track sections may be interconnected to form a track loop.

According to yet another aspect, the present invention provides storage containers for a material handling system in which the storage containers have first and second connectors that are connectable to provide a connection that impedes horizontal displacement of a first storage container relative to a second storage container. The connection of the first and second connectors may be sufficient to support the weight of the second container during horizontal displacement such that displacing the first container horizontally displaces the second container horizontally when the first and second connectors are connected. Additionally, the connection of the first and second connectors may permit vertical displacement of the first container relative to the second container.

According to another aspect, the system may provide storage containers having first and second connectors for releasably connecting first and second storage containers wherein the first and second connectors are configured such that displacement of the first connector vertically relative to the second connector disconnects the first connector from the second connector.

The present invention further provides storage containers having first and second connectors for interconnecting the storage containers with one another, wherein the first connector comprises a tongue and the second connector comprises a groove configured to receive the tongue.

According to another aspect, the present invention provides a storage location in which first and second containers are located and the storage location is configured to house the first and second containers in horizontal alignment in which the first container is positioned in front of the second container. Optionally, the storage location may be configured so that when a delivery vehicle is aligned with the first container, the first container separates the second vehicle from the delivery vehicle.

The present invention further provides a material handling system having a plurality of storage locations each configured to store a plurality of storage containers. Optionally, the storage locations each have a depth and first and second one of the storage containers each have a length and the depth of the one storage location is at least as long as the combined length of the first and second containers.

According to another aspect, the present invention provides delivery vehicles for a material handling system and each vehicle has a generally planar platform for receiving the containers.

According to yet another aspect, the present invention provides a material handling system that includes a first rack of storage locations spaced apart from a second rack of storage locations so that an aisle is formed between the first rack and the second rack.

Optionally, the material handling system may include a pick station disposed at an end of aisle. Vehicles may deliver storage containers to the pick station so that operators can retrieve items from the storage containers at the pick station.

According to another aspect, the system may include vehicles that are displaceable within an aisle. The vehicles may comprise drive wheels that engage a track and racks of storage locations may be positioned relative to the track so that storage containers project horizontally into the aisle beyond the track.

According to a further aspect, the present invention provides containers for a material handling system and the containers contain one or more engagement elements configured to engage a transfer mechanism of vehicles that deliver the containers.

According to a further aspect, the present invention provides a container for use in a material handling system for storing or retrieving a plurality of items. The container includes a plurality of walls and first and second connectors configured to be connectable to form a releasable connection between two of the storage containers. The storage container may include an engagement element configured to cooperate with a transfer mechanism of the material handling system to displace the storage container horizontally. Additionally, the material handling system may include storage locations and the container may have a length that is at less than or equal to half the depth of the storage location so that two of the containers will fit in the storage location when the two containers are connected together. The first and second connectors may also be connectable to form a releasable connection.

Still further, the present invention may provide a combination of first and second containers for use in a material handling system. The two containers may be similarly configured so that a first connector of the first container is connectable with a second connector of the second container to connect the two containers such that horizontal displacement of the first container by a transfer mechanism of a delivery vehicle displaces the second container. Optionally, the connection of the first connector of the first container and the second connection of the second container impedes horizontal displacement of the first container relative to the second container.

The present invention also provides a method for storing and retrieving containers from a plurality of storage locations. The method includes the step of driving a first vehicle with a first storage container along a transport path among a plurality of storage locations. The first storage container is unloaded from the first vehicle into a first storage location. The first storage container is releasably connected with a second storage container in the first storage location. The first vehicle is then displaced away from the first storage location after the step of unloading.

According to another aspect, a method for storing and retrieving containers includes the step of disconnecting a first storage container in a storage location from a second storage container in the storage location. Optionally, the step of releasably connecting comprises displacing the first container vertically relative to the second container.

According to a further aspect, a method for storing and retrieving containers using vehicles includes the step of disconnecting first and second connected containers by displacing the first container vertically relative to the second container.

According to yet another aspect, a method for storing and retrieving containers using vehicles includes the step of loading a first storage container onto a vehicle after a step of releasably connecting the first storage container and a second storage container such that during the step of loading the first storage container pulls the second storage container toward the vehicle.

According to a further aspect, a method for storing and retrieving containers using vehicles includes the step of unloading a first storage container into a storage location. The step of unloading comprises pushing the first storage container against a second storage container to drive the second container deeper into the storage location. The step of unloading may include the step of actuating an unloading mechanism on the first vehicle to drive the first storage container off the first vehicle.

BRIEF DESCRIPTION OF THE DRAWINGS

The foregoing summary and the following detailed description of the preferred embodiments of the present invention will be best understood when read in conjunction with the appended drawings, in which:

FIG. 11 is a fragmentary perspective view of a portion of a storage rack of the apparatus illustrated in FIG. 1;

FIG. 13 is a fragmentary side view of a releasable connection between storage containers of the apparatus illustrated in FIG. 1, in which the storage containers are connected; and FIG. 14 is a fragmentary side view of a releasable connection between storage containers of the apparatus illustrated in FIG. 1, in which the storage containers are disconnected.

DETAILED DESCRIPTION

Figure 1:
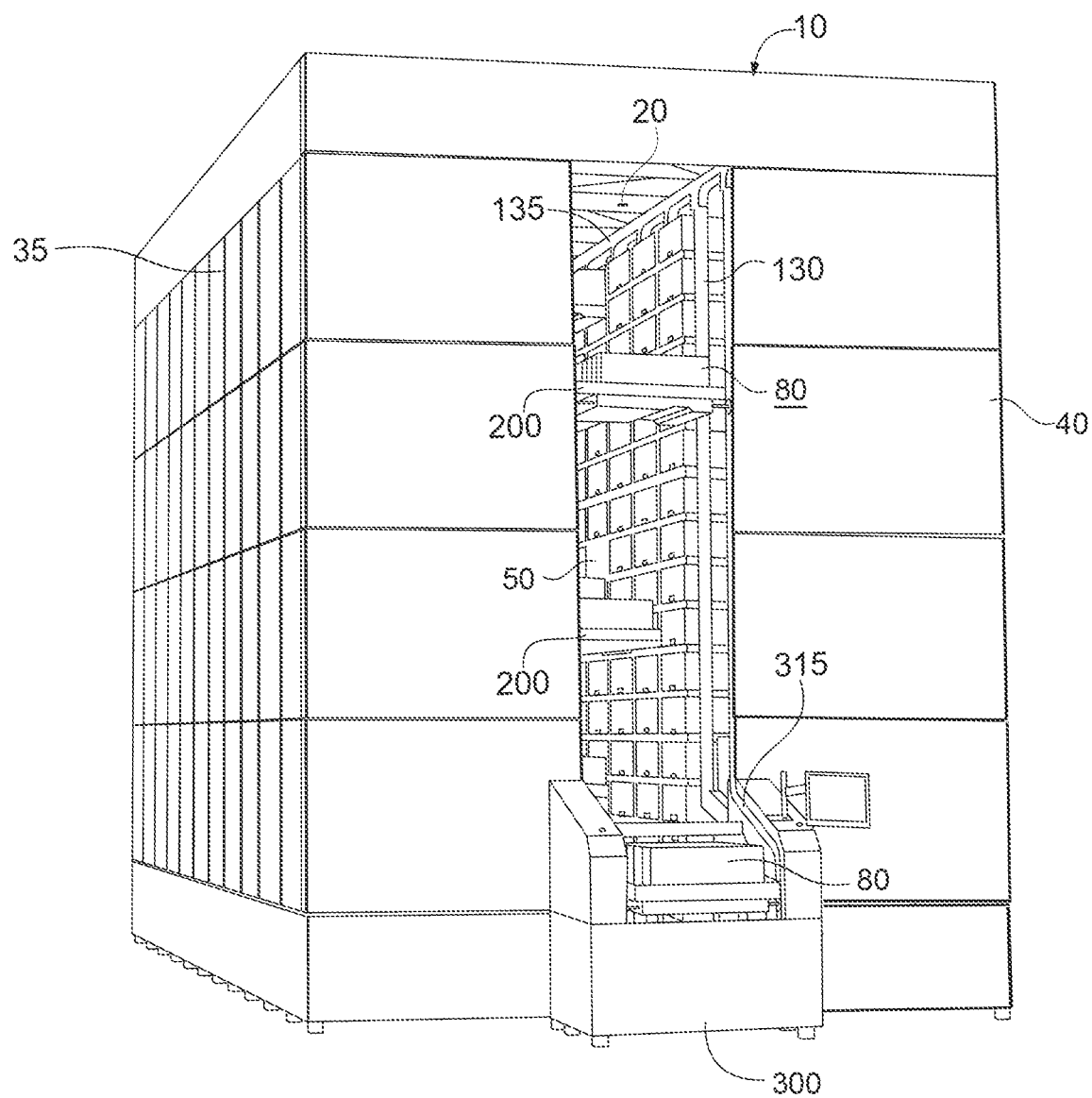
FIG. 1 is a perspective view of a storing and retrieving apparatus.

Referring now to the figures in general and to FIG. 1 specifically, a material handling apparatus adapted to store and/or retrieve items is designated generally 10. The apparatus 10 includes a plurality of vehicles for transporting items along a transport path between a first location and a second location. In some embodiments, consistent with the present disclosure, the first location is a storage location selectable from among a plurality of storage locations 50 in one or more storage racks and the second location is an article transfer station 300 where items may be picked, sorted and/or transferred from or to receptacles for storage, such as storage containers 80. The apparatus 10 moves items (or containers which contain items) along the conveying path.

In some embodiments, the apparatus includes a plurality of transport vehicles or vehicles 200 that travel along one or more pathways in an aisle 20 adjacent one or more racks 35, 40 that are configured to store a plurality of storage containers 80. For instance, as shown in FIG. 1, the aisle 20 may be an elongated aisle formed between a pair of racks 35, 40 so that the vehicles move within the aisle along one or more pathways. A track 110 may provide one or more pathways within the aisle for the vehicles to travel to storage locations in the racks. For instance, an embodiment may include a front track 115 adjacent a front rack 35 on one side of the aisle. A rear track 120 adjacent a rear rack 40 may be spaced apart from the front track 115 to form the aisle 20. The vehicles 200 may move within the aisle 20 along the track. For instance, the vehicle may be supported by one or more front wheels that engage the front track 115 and one or more rear wheels that engage the rear track 120.

Each storage rack 35, 40 provides a plurality of storage locations 50 for storing containers 80 that store various items. The vehicles move along the track 110 to storage locations. At a storage location 50, a vehicle can transfer an item from the vehicle into one of the storage locations. Similarly, the vehicle can transfer an item from one of the storage locations 50 onto the vehicle. Additionally, the system 10 may be configured so that the vehicle 200 transfers an item from the vehicle to a storage location 50 while at the same time transferring an item from a different storage location onto the vehicle. The storage locations 50 may be arranged as an array of locations adjacent the aisle. Additionally, as discussed further below, the racks 35, 40 may provide storage depth so that the storage containers 80 may be stored two or more deep to increase the storage density of the storage containers 80 in the racks 35.

Storage Racks

The details of the storage rack 35, 40 and the storage locations 50 in the storage racks will now be described in greater detail. Referring to FIG. 1, the system 10 may include one or more storage racks 35, 40. Each storage rack may provide an array of destination areas or storage locations 50 for receiving items. The storage locations 50 may be arranged in columns, however, the storage locations may be arranged in any of a variety of configurations, such as rows. In the following description, the system 10 is described as delivering and/or retrieving items to and from storage areas 50. The items may be configured so that an individual item is stored at a storage location 50. However, in a typical operation environment, the items are stored in or on a storage mechanism, such as a container 80 or platform.

Referring now to FIGS. 8-12, the storage racks 35, 40 and in particular, the storage locations 50 will be described in greater detail. The storage locations 50 can be any of a variety of configurations. For instance, the simplest configuration is a shelf for supporting the items or the container 80 holding the items. Similarly, the storage locations 50 may include one or more brackets that cooperate with the storage mechanism to support the storage mechanism in the storage location 50.

Figure 8:
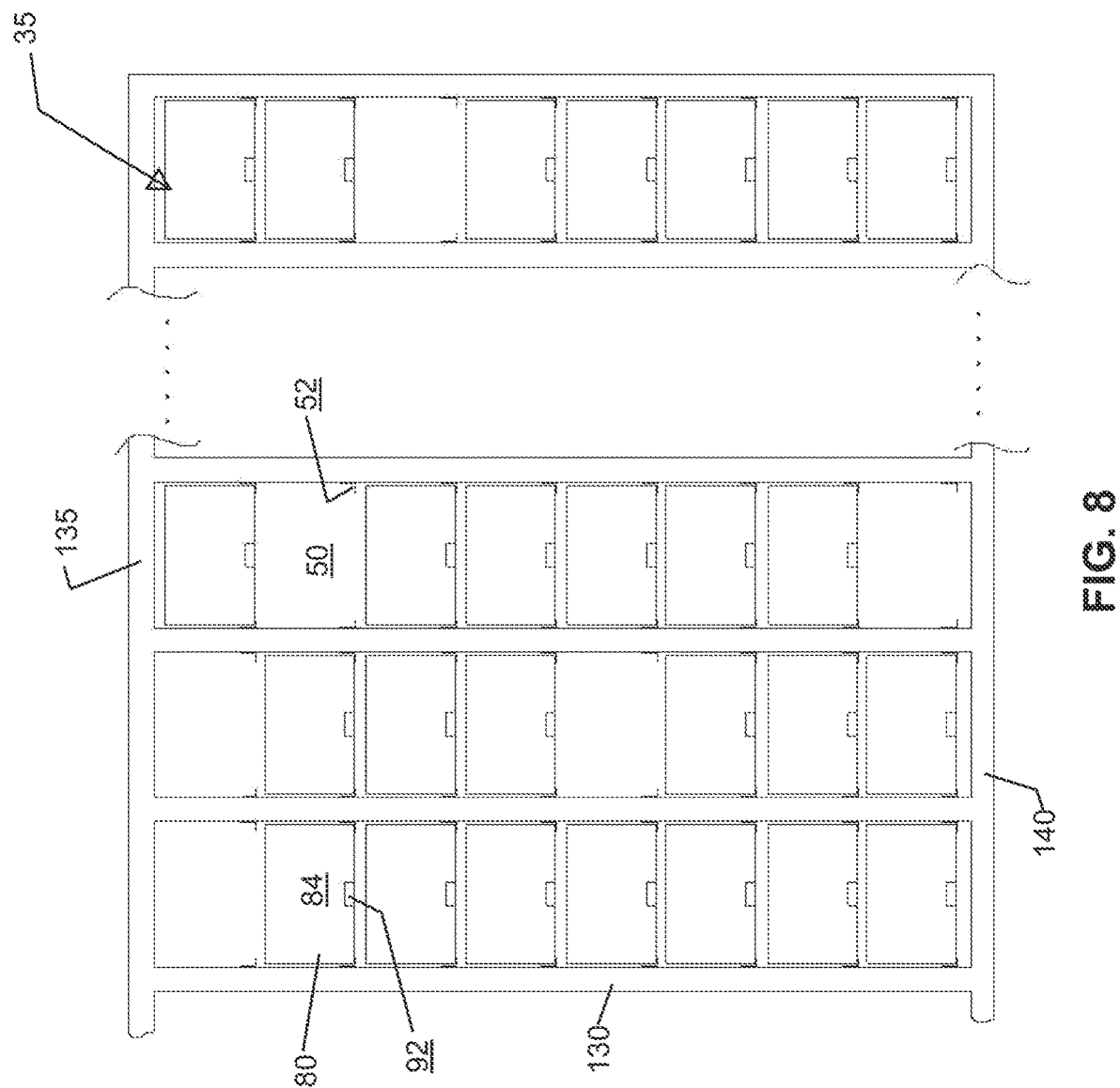
FIG. 8 is a side diagrammatic view of a plurality of storage locations of the apparatus illustrated in FIG. 1.
Figure 12:
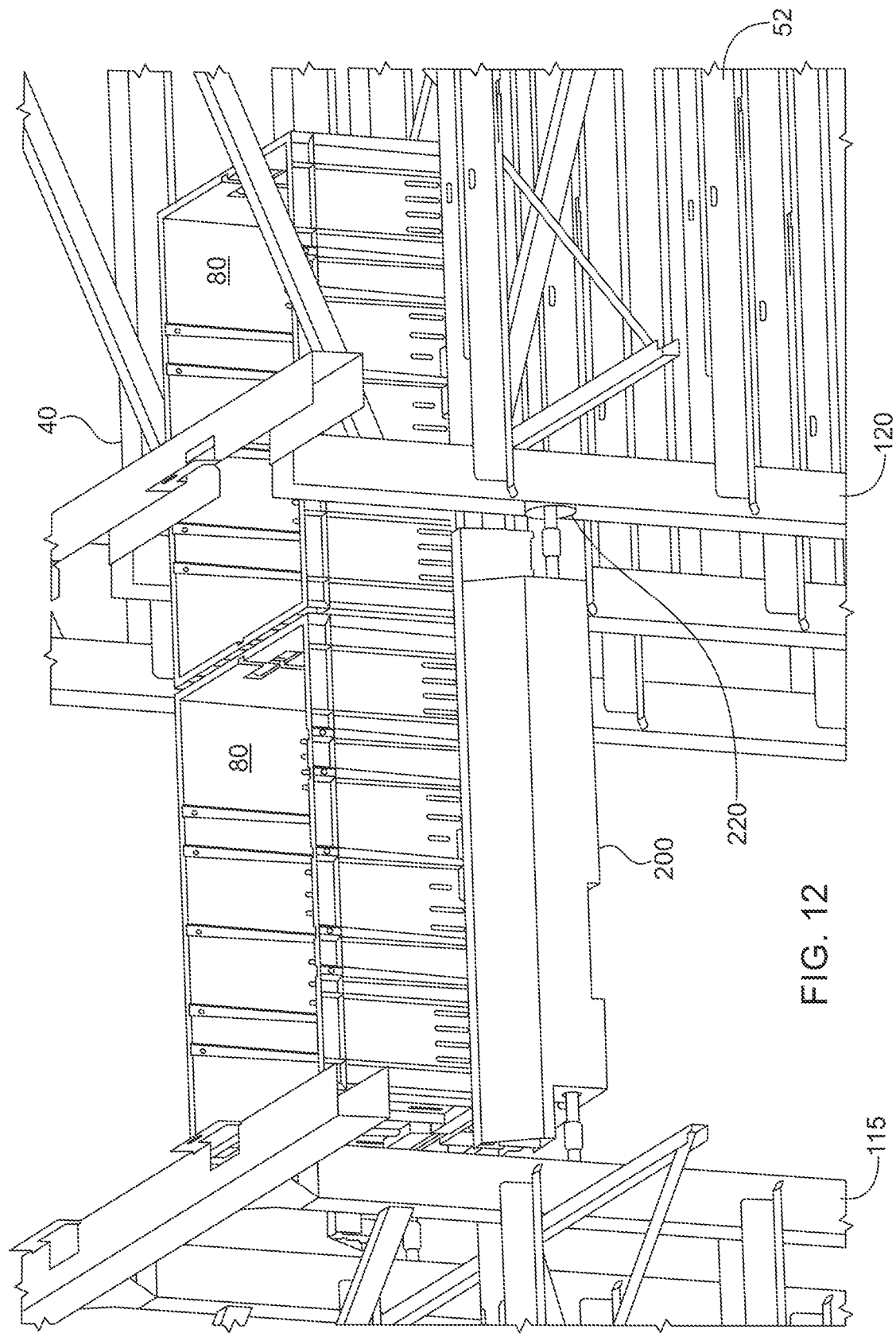
FIG. 12 is a fragmentary perspective view of a portion of a storage rack of the apparatus illustrated in FIG. 1 including a vehicle of the apparatus.

As shown in FIGS. 2, 8 and 11-12, the rack 35 may include a plurality of vertical supports, such as vertical beams, interconnected with a plurality of horizontal supports, such as horizontal beams. In the present instance, the track 110 may form part of the vertical or horizontal support beams. For instance, the rack 35 may comprise an array of columns, with each column formed by a plurality of vertical supports. Each column may be defined by two front vertical support beams and two rear vertical support beams. As shown in FIG. 11, the front vertical beams may comprise the vertical legs 130 of the track. Each column may include a plurality of storage areas 50. In particular, each column is separated into a plurality of storage areas or cells 50. Each cell 50 includes a support element for supporting a container 80 so that the container can be stored in the cell. The support elements may be any of a variety of elements for supporting a container 80 in the storage location. For instance, each storage location 50 may include a shelf or other horizontal support onto which a container 80 may be placed. For instance, as shown in FIGS. 8 and 11-12, the rack 35 may include a plurality of brackets, such as L-channels 52 attached to the vertical supports 130. The brackets 52 may extend substantially the depth of each storage location 50. In this way, each storage location 50 may be defined as the area extending between adjacent vertical supports 130 and extending upwardly from adjacent a pair of horizontal supports elements 52 to a point adjacent an upper pair of horizontal supports 52 or the top of the rack 35.

Additionally, as shown in FIG. 11, each storage location 50 may be configured so that the containers 80 project inwardly toward the aisle so that the inner end of the container projects inwardly beyond the vertical supports. In other words, the containers 80 may be stored in the storage locations 50 so that the inner edge of the container (with respect to the aisle 20) overhangs into the aisle.

Figure 9:
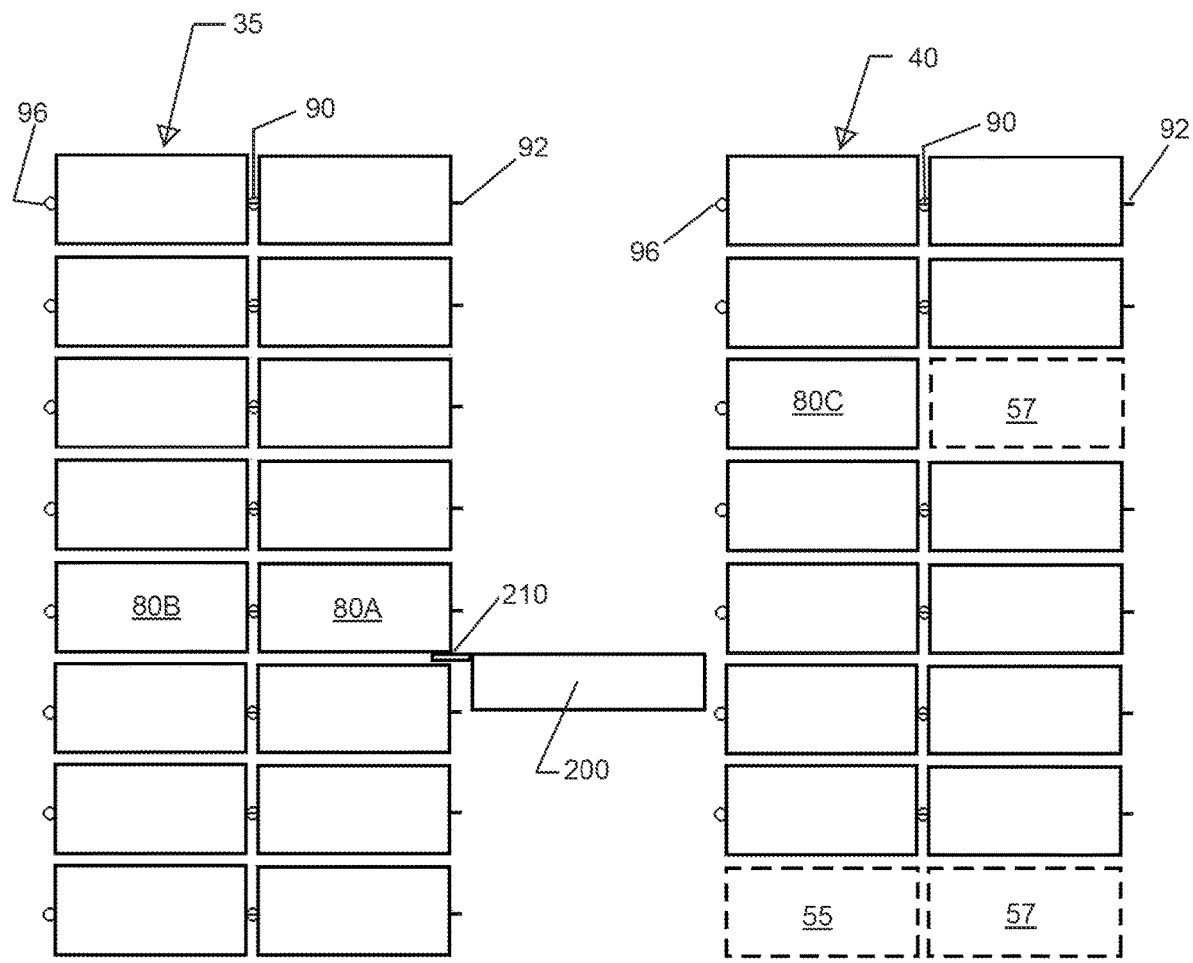
FIG. 9 is diagrammatic side view of storage containers in the storage locations of the apparatus illustrated in FIG. 1.

Referring now to FIG. 9, the racks 35, 40 may be configured so that one or more of the storage locations 50 is deep enough to accommodate a plurality of containers 80. For example, one or more of the storage locations 50 are at least approximately twice as deep as the storage containers 80 so that two storage containers can be stored, with one storage container stored behind the other storage container. It should be understood that the storage locations 50 may be configured to accommodate any number of storage containers 80. For instance, the racks 35, 40 may be configured so that one or more of the storage locations 50 can accommodate three containers 80, so that the containers are three-deep. In such an embodiment, the storage location 50 is approximately three times as deep as the length of the storage container 80. Similarly, the depth of the rack 35, 40 can be increased to be approximately "n" times the length of the storage containers 80 to accommodate "n" storage containers stored "n" deep, wherein "n" is an integer.

In the exemplary arrangement of FIG. 9, the system 10 is illustrated in connection with an arrangement for storing containers 80 in a "n" deep arrangement, in which "n"=2. Although the apparatus 10 may include only a single rack on one side, in FIG. 9, the system is illustrated with two racks, front rack 35 and rear rack 40. Additionally, each rack is illustrated as being configured to accommodate containers 80 in a two-deep arrangement. However, it should be understood that the racks 35, 40 do not need to be configured to accommodate the same number of containers 80. For instance, the front rack 35 may be configured as a two-deep rack and the rear rack 40 may be configured as a single deep rack.

In the following discussion, the storage locations 50 will be described relative to the arrangement illustrated in FIGS. 8-9. Each storage location 50 includes an inner storage location 55 and an outer storage location 57. Each of the inner and outer storage location 55, 57 is configured to accommodate a container 80. The inner storage locations 55 are adjacent the aisle 20. The outer storage locations 57 are behind the inner storage locations 55, so that the inner storage location 55 separates the outer storage 57 location from the aisle 20 and the vehicle 200. In the present instance, the inner storage location 55 has a depth that is approximately the same as the length of a container 80. Similarly, the outer storage location 57 has a depth that is approximately the same as the length of the container 80. The outer storage locations 57 may be considered remote storage locations because they are separated from the aisle by an inner storage location 55. In a system having a depth of greater than two, the remote locations include storage locations that are separated from the aisle by an inner storage location 55 and one or more outer storage locations 57.

As discussed previously, the system 10 may include a plurality of vehicles 200 that are conveyed to the storage locations 50 to transfer items to and from the storage locations. In particular, the vehicles 200 may include a loading/unloading mechanism to transfer items into a storage location 50 or withdraw an item from the storage location. In an embodiment in which the storage containers 80 are stored two or more deep, the system 10 is configured so that the vehicles 200 are able to retrieve containers 80 stored in one of the remote storage locations 57. For instance, each vehicle may include a loadings/unloading element 210 that extends outwardly to a remote storage location to engage a storage container 80 in a remote storage location 57 to move the container 80 to an inner storage location 55 and/or to load the container onto the vehicle 200 from the remote storage location 57. Alternatively, a separate mechanism may be utilized to move containers from a remote storage location 57 to an inner storage location 55. For instance, the rack 35 may include a drive mechanism operable to drive a container 80 toward the aisle from a remote storage location 57. The drive mechanism may be separately powered or may interact with a drive mechanism from one of the vehicles 200. Yet another alternative is to interconnect a container 80 in a remote storage location 57 with an adjacent container such that displacing one of the containers displaces both containers. For instance, a container 80 in a remote storage location 57 may be releasably connected with a container 80 in an inner storage location 55. When the container 80 in the inner storage location 55 is moved toward the aisle 20, the container 80 in the remote storage location 57 is displaced toward the inner storage location 55.

Referring now to FIGS. 11-14, the storage containers 80 are configured to connect with adjacent containers. In particular, the storage containers 80 are configured to releasably connect with one or more adjacent containers. For instance, as shown in FIG. 13, a releasable connector 90 connects two adjacent containers 80A, 80B. The releasable connector 90 selectively connects the two containers 80A, 80B. In this way, displacing container 80A horizontally also displaces container 80B. Additionally, the releasable connector 90 may inhibit relative motion in one direction, while allowing relative motion in a second or transverse direction. For example, the connector 90 may connect containers 80A and 80B so that horizontal displacement of one container also displaces the other container. At the same time the releasable connector 90 may be configured to allow vertical displacement of one container 80 relative to the other. In the embodiment illustrated in FIGS. 11 and 13-14, the releasable connector 90 is configured to permit relative vertical displacement to connect or disconnect two adjacent containers 80 as discussed further below.

In the following discussion, the details of an exemplary storage container 80 are provided. The container 80 may be similar to a carton or box without a lid, so that an operator can easily reach into the container to retrieve an item at the picking station. Although the present system 10 is described as using containers 80, it should be understood that any of a variety of storage mechanisms can be used, such as pallets or similar platforms. Accordingly, in the following discussion, the term container is intended to include items intended to store and/or support items, including, but not limited to a pallet, platform, tray, carton, box, receptacle or similar structure.

The storage container 80 may be rectangular prism having a generally planar bottom 83 A and 83B. The bottom 83A and 83B is substantially horizontal, forming a platform for receiving items. The container may also include a plurality of generally vertical walls extending upwardly from the bottom 83A and 83B. For instance, the container 80 may include generally parallel side walls 82. The container may include a forward wall 84 that projects upwardly from the bottom 83A and 83B. The forward wall or front face 84 may extend between side walls 82 to connect the side walls. Additionally, the container may include a rear wall 86 that projects upwardly from the bottom. The rear wall 86 may be generally parallel with the front wall 84. The rear wall 86 may also extend between the side walls 82 to connect the side walls. Accordingly, the walls (82,83 A and 83B,84,86) of the container 80 define an interior space in which items can be stored.

The containers 80 may include one or more elements configured to cooperate with the vehicles to transfer the containers onto or off of the vehicles 200. For instance, the containers may include a hook, detent, socket, or other physical structure configured to cooperate with the vehicles. In the present instance, the containers may include a retention slot or groove 88 configured to cooperate with a loading/unloading element 212 of the vehicles. The retention groove 88 may be formed in the underside of the container 80, below the bottom 83 A and 83B. The retention groove 88 may be spaced rearwardly from the front face 84 of the container as shown in FIGS. 11 and 13. The retention groove 88 may extend substantially the entire width of the container. The groove may also have open ends on both sides 82 as shown in FIGS. 11 and 13 so that the groove is a through slot. As shown in FIG. 13, the groove may have a depth that is deeper than the thickness of the loading/unloading element 212 of the vehicle 200 so that the loading/unloading element remains nested within the groove to drive the container inwardly or outwardly when the loading/unloading element is displaced horizontally. The container 80 may also include a second groove or slot 88 adjacent the rearward wall 86. The second groove may be configured substantially similarly to the first wall and may be formed adjacent the rearward wall, spaced forwardly from the rearward wall 86.

Referring to FIGS. 13-14, a releasable connector 90 is illustrated for releasably connecting adjacent containers 80A, 80B. The connector 90 may facilitate displacement of one of the containers from a remote storage location 57 to an inner storage location 55. The releasable connector 90 may be cooperating hooks or latches. For instance, the releasable connector 90 may be formed of a pair of cooperable connectors 92B, 96A. A forward connector 92 may be connected with the forward end 84 of the container 80 and a rearward connector 96 may be connected with the rearward end of the container 80. In this way, the forward connector 92B of a first container 80B is releasably connectable with the rearward connector 96A of a second container 80A to connect the two containers. In one embodiment, the forward connector 92 is a hook in the form of a tongue extending downwardly generally vertically (see 92B in FIG. 14). The forward connector 92 projects downwardly from a recess adjacent the forward end of the container. In the present instance, the forward connector 92 is an L-shaped bracket. The L-shaped bracket 92 may have a body portion rigidly and fixedly connected with the bottom of the container. For example, the body portion of the forward connector 92 may extend substantially horizontally and may be affixed to the container by a fastener extending through the forward connector 92 and into the container 80. The tongue 94 of the forward connector 92 may project transverse the body portion so that the tongue projects downwardly to form a vertical hook or flange that engages the second connector 96. As shown in FIG. 14, the forward connector 92 may be connected to the container 80 forwardly of the groove 88 used to engage the loading/unloading mechanism 212 of the vehicle.

The rearward or second connector 96 may be a second hook that cooperates with the first hook 92. The rearward connector 96 may project rearwardly from the rearward end of the container 80. In the present instance, the second connector 96 incorporates a hook or flange that projects vertically upwardly. Specifically, the second connector 96 may comprise a groove or channel 98 configured to receive the tongue 94 of the first connector 92. The channel 98 may be connected to a rearward end 86 of the container 80 so that the channel projects rearwardly from the rearward end. The second connector may have a body portion rigidly and fixedly connected with the bottom of the container. For example, the body portion of the rear connector 96 may be a generally flat portion extending substantially horizontally and may be affixed to the container by a fastener extending through the connector 96 and into the container.

As shown in FIGS. 9 and 13, the tongue 94B of the forward connector 92B of a first container 80B is inserted into the slot 98A of the rearward connector 96A of the second container 80A to connect the first and second containers. As discussed further below, the connection between the two containers 80A, 80B allows the containers to move together when one of the containers is displaced. In this way, pulling a first container 80A from an inner storage location 55 onto a vehicle 200 pulls a connected container 80B from a remote storage location 57 toward an inner storage location 57.

Track

Figure 2:
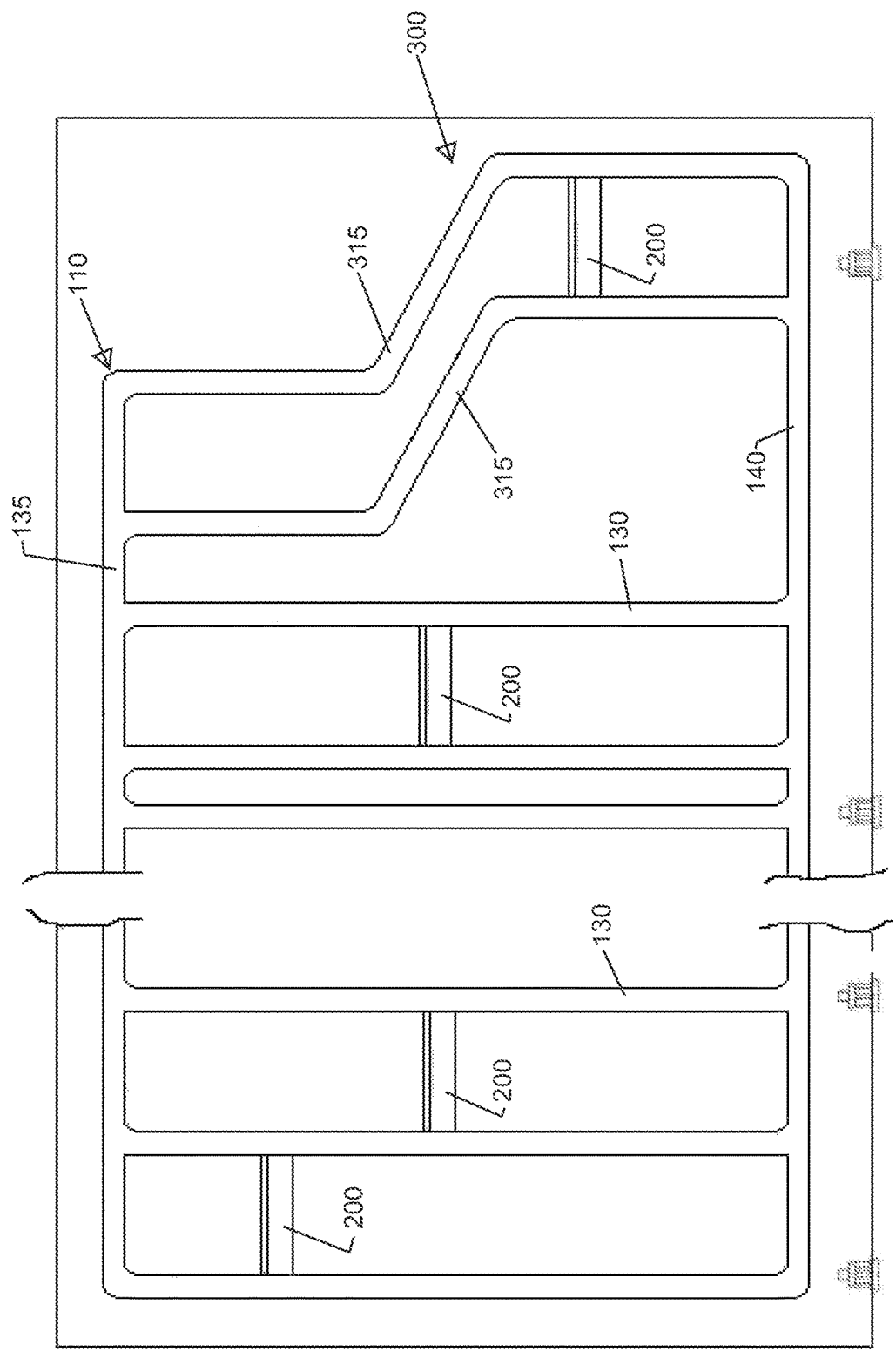
FIG. 2 is a fragmentary side view, illustrating a track of the storing and retrieving apparatus illustrated in FIG. 1.
Figure 3:
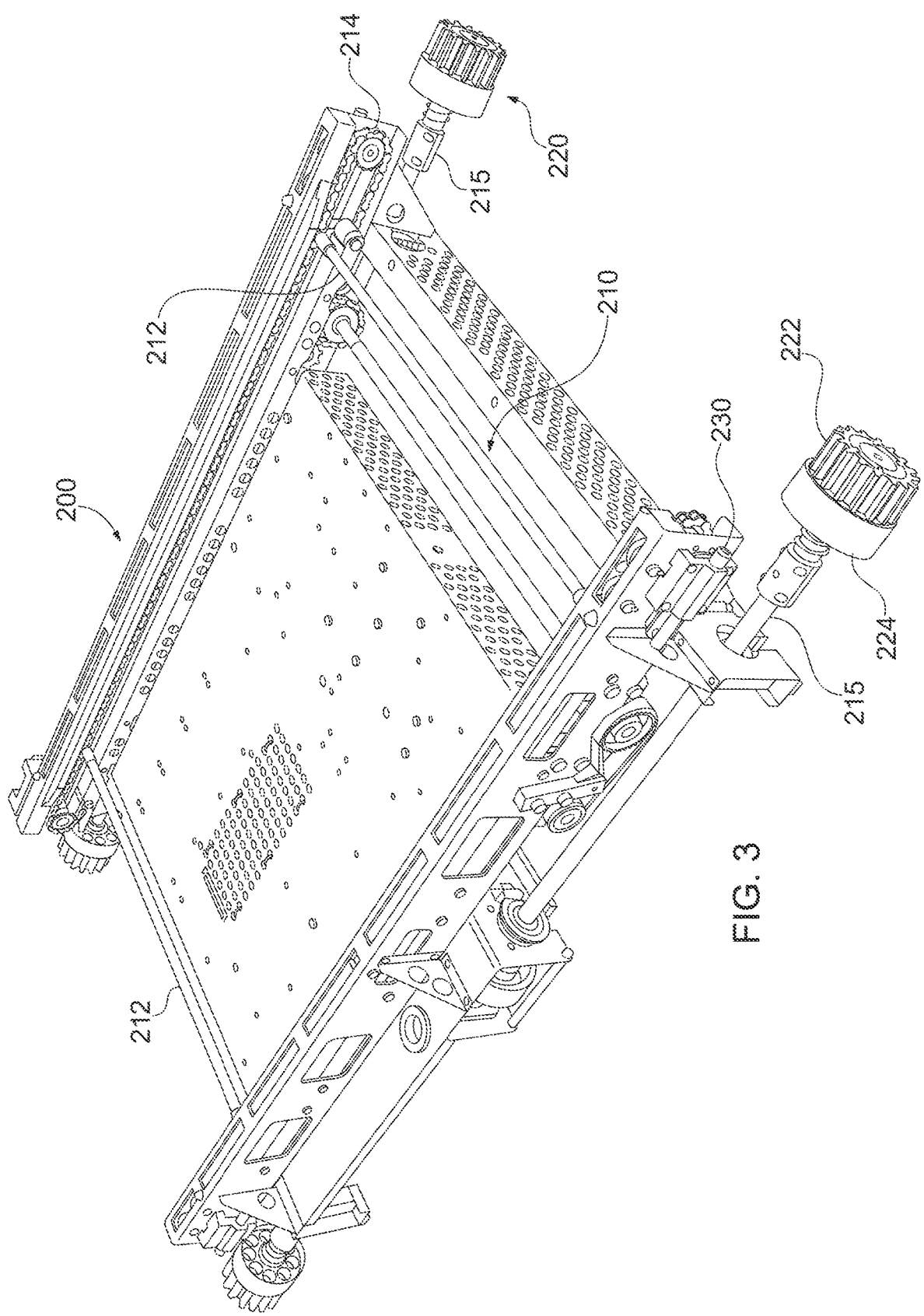
FIG. 3 is an enlarged perspective view of a vehicle of the storing and retrieving apparatus illustrated in FIG. 1.

As can be seen in FIGS. 1, 2 and 12, a track 110 may be provided adjacent the storage locations 50 to direct the vehicles 200 to the storage locations. The track 110 may include a front track 115 and a rear track 120 that are parallel to one another to guide the vehicles around the track. As shown in FIG. 3, each of the vehicles includes four wheels 220: two forward wheels and two rearward wheels. The forward wheels 220 ride in the front track 115, while the rearward wheel ride in the rear track 120. It should be understood that in the discussion of the track the front and rear tracks 115, 120 are similarly configured opposing tracks that support the forward and rearward wheels 220 of the vehicles. Accordingly, a description of a portion of either the front or rear track also applies to the opposing front or rear track.

Referring to FIGS. 4-7, the details of the track 110 will be described in greater detail, however, as noted above, it should be appreciated that the illustrated track is merely an exemplary track that can be used with the system. The precise configuration may vary according to the application and as noted above, the system 10 may not include the track.

Figure 7:
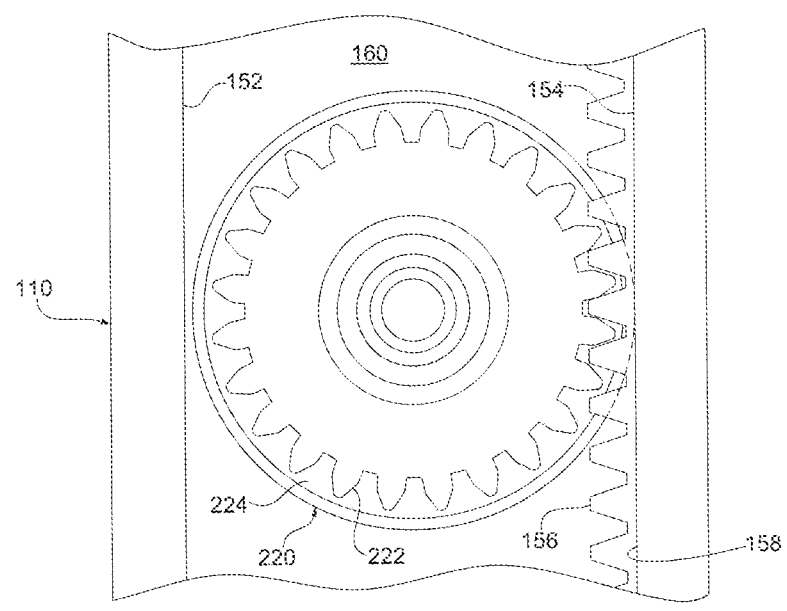
FIG. 7 is an enlarged fragmentary view of a wheel of the vehicle illustrated in FIG. 3 and a portion of the track illustrated in FIG. 2.

The track 110 may include an outer wall 152 and an inner wall 154 that is spaced apart from the outer wall and parallel to the outer wall. The track also may have a back wall 160 extending between the inner and outer walls. As can be seen in FIG. 7, the outer and inner walls 152, 154 and the back wall form a channel. The wheels 220 of the vehicle ride in this channel.

The track 110 may include both a drive surface 156 and a guide surface 158. The drive surface 156 positively engages the vehicles 200 to enable the vehicles to travel along the track 110. The guide surface 158 guides the vehicle 200, maintaining the vehicle in operative engagement with the drive surface 156. In the present instance, the drive surface 156 is formed of a series of teeth, forming a rack that engages the wheels of the vehicles as described further below. The guide surface 158 is a generally flat surface adjacent the rack 156. The rack 156 extends approximately halfway across the track 110 and the guide surface 158 extends across the other half of the track 110. As shown in FIGS. 4-7, the rack 156 may be formed on the inner wall 154 of the track. The opposing outer wall 152 may be a generally flat surface parallel to the guide surface 158 of the inner wall.

As described above, the track 110 may include a plurality of vertical legs 130 extending between the horizontal upper and lower rails 135, 140. An intersection 170 may be formed at each section of the track at which one of the vertical legs 130 intersects one of the horizontal legs 135, 140. Each intersection 170 may include an inner branch 172 that is curved and an outer branch 176 that is generally straight. The intersections of the vertical legs 130 with the lower rail 140 incorporate similar intersections, except the intersections are reversed.

Each intersection 170 may include a pivotable gate 180 that may have a smooth curved inner race and a flat outer race that has teeth that correspond to the teeth of the drive surface 156 for the track. The gate 180 may pivot between a first position and a second position. In the first position, the gate 180 is closed so that the straight outer race 184 of the gate is aligned with the straight outer branch 176 of the intersection. In the second position, the gate is open so that the curved inner race 182 of the gate is aligned with the curved branch 172 of the intersection.

Figure 6:
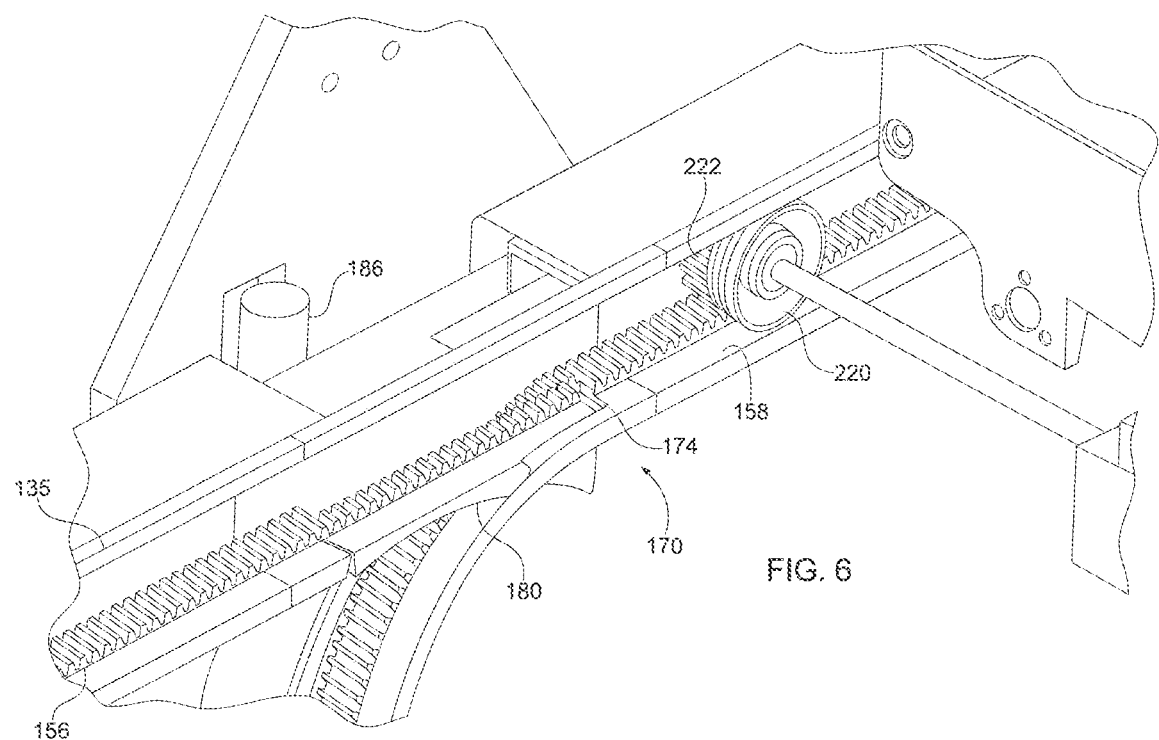
FIG. 6 is an enlarged perspective view of a gate of the track illustrated in FIG. 2.

Accordingly, in the closed position, the gate 180 pivoted downwardly so that the outer race 184 of the gate aligns with the drive surface 156. In this position, the gate 180 blocks the vehicle 200 from turning down the curved portion, so that the vehicle continues straight through the intersection. In contrast, as illustrated in FIG. 6, when the gate 180 is pivoted into the open position, the gate blocks the vehicle 200 from going straight through the intersection. Instead, the curved inner race 182 of the gate aligns with the curved surface of the inner branch 172 and the vehicle 200 turns through the intersection 170. In other words, when the gate 180 is closed, a vehicle 200 goes straight through the intersection 170 along either the upper rail 135 or the lower rail 140, depending on the location of the intersection. When the gate 180 is opened, the gate directs the vehicle from either a vertical rail 130 to a horizontal rail 135, 140 or from a horizontal rail to a vertical rail, depending on the location of the intersection.

In the foregoing description, the gates 180 allow one of the vehicles 200 to either continue in the same direction (e.g. horizontally) or turn in one direction (e.g. vertically). However, in some applications, the system may include more than two horizontal rails that intersect the vertical columns. In such a configuration, it may be desirable to include a different rail that allows the vehicles to turn in more than one direction. For instance, if a vehicle 200 is traveling down a column, the gate may allow the vehicle to turn either left or right down a horizontal rail, or travel straight through along the vertical column. Additionally, in some instances, the vehicles may travel upwardly.

Figure 4:
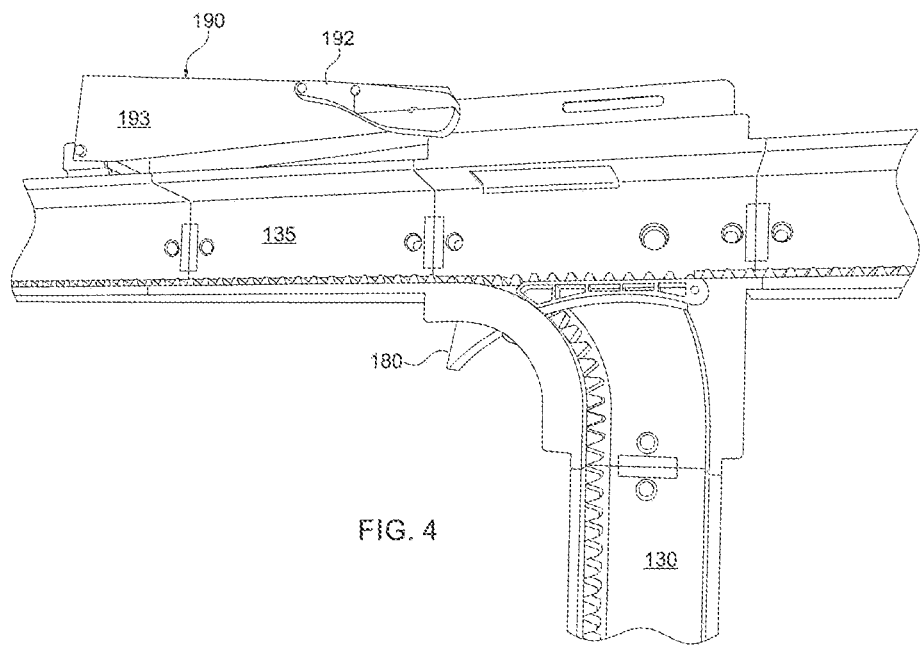
FIG. 4 is an enlarged perspective view of a gate of the track illustrated in FIG. 2.

Since the system 10 includes a number of vehicles 200, the positioning of the vehicles is controlled to ensure that the different vehicles do not crash into each other. In one embodiment, the system 10 uses a central controller that tracks the position of each vehicle 200 and provides control signals to each vehicle to control the progress of the vehicles along the track. The central controller may also control operation of the various elements along the track, such as the gates 180. Alternatively, the gates may be actuated by the vehicles 200. For instance, referring to FIGS. 4-5, the gates 180 may include a passive actuator 190 that responds to an actuator 230 on the vehicles. If the actuator on the vehicle engages the gate actuator 190 then the gate moves from a first position to a second position. For instance, as shown in FIG. 4, the gate is in a first position so that the vehicle will remain along the horizontal rail 135. If the gate actuator 230 on the vehicle 200 engages the actuator 190 on the gate, the gate 180 will pivot upwardly into a second position so that the vehicle will turn and move downwardly along the vertical rail 130.

Figure 5:
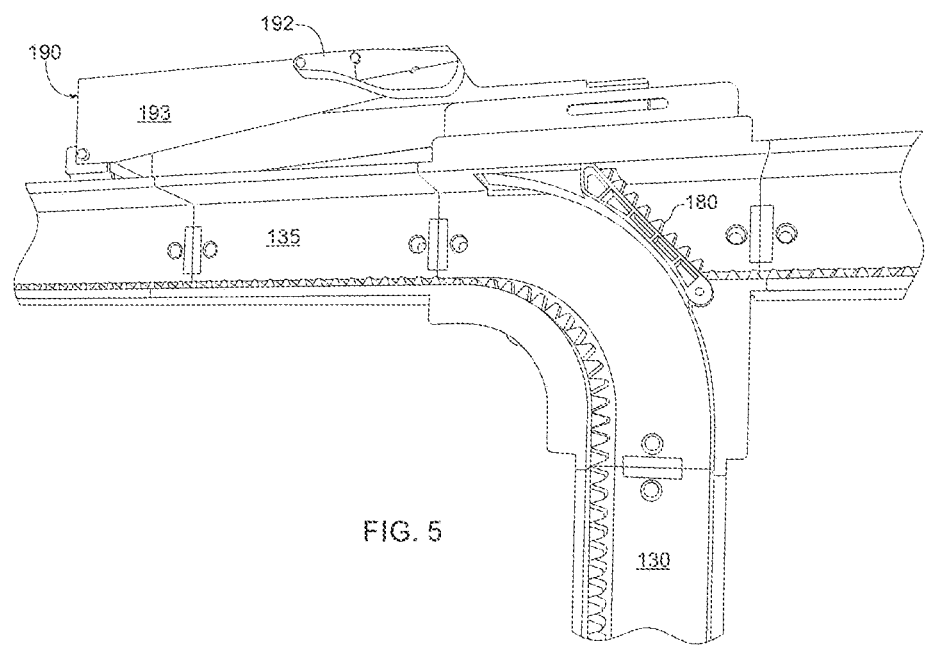
FIG. 5 is an enlarged perspective view of a gate of the track illustrated in FIG. 2.

The actuators 190 on the gates 180 may be moveable actuation surfaces 192 connected to the gate by a linkage. For instance, the actuation surface 192 may be mounted on a pivotable arm 193. To actuate the gate 180 and move it from the first position to the second position, the gate actuator 230 on the vehicle contacts the actuation surface 192. The actuation surface 192 is angled similar to a ramp, so that as the vehicle 200 advances toward the gate 180, the gate actuator 230 on the vehicle engages the actuation surface and progressively displaces the arm 193 upwardly. The arm 193 may be connected to the gate 180 by a linkage. Accordingly, when the arm 193 pivots, the gate pivots as well. In this way, the actuator 230 on the vehicle engages the actuator 190 on the gate to move the gate 180 from the first position to the second position as shown in FIGS. 4-5. After the vehicle 200 passes an open gate, such as shown in FIG. 5, the gate 180 may return to the closed position shown in FIG. 4. The gate 180 may close automatically, such as by a biasing element or the weight of the gate and/or actuator.

Delivery Vehicles

Referring to FIG. 3, the details of the delivery vehicles 200 will be described in greater detail. Each delivery vehicle is a semi-autonomous vehicle that may have an onboard drive system, including an onboard power supply. Each vehicle may also include a mechanism for loading and unloading items for delivery. Optionally, each vehicle may also include a gate actuator 230 for selectively actuating the gates 180 to allow the vehicle to selectively change direction.

The vehicle 200 may incorporate any of a variety of loading/unloading mechanisms for loading an item onto the vehicle and discharging the item from the vehicle into one of the bins. Additionally, the loading/unloading mechanism 210 may be specifically tailored for a particular application. In the present instance, the loading/unloading mechanism 210 may comprise a displaceable element configured to engage an item stored at a storage location 50 tip and pull the item onto the vehicle 200. More specifically, in the present instance, the vehicle 200 includes a displaceable element 212 configured to move toward a container 80 in a storage location 50. After the displaceable element 212 engages the container 80, the displaceable element is displaced away from the storage location 50, thereby pulling the container onto the vehicle 200.

In the present instance, the loading/unloading mechanism 210 may comprise a displaceable rod or bar 212. The bar 212 may extend across the width of the vehicle 200 and both ends may be connected with drive chains that extend along the sides of the vehicle. A motor may drive the chains to selectively move the chain toward or away from storage locations 50. For example, as the vehicle 200 approaches a storage location 50 to retrieve a container 80, the chain may drive the rod 212 toward the storage location so that the bar engages a groove or notch 88 in the bottom of the container 80. The chain then reverses so that the bar 212 moves away from the storage location 50. Since the bar is engaged in the notch 88 in the container, as the bar moves away from the storage location, the bar 212 pulls the container 80 onto the vehicle. In this way, the loading/unloading mechanism 210 may be operable to retrieve items from a storage location 50. Similarly, to store an item in a storage location 50, the chain of the loading/unloading mechanism 210 drives the bar 212 toward the storage location until the item is in the storage location. The vehicle may then moves downwardly to disengage the bar 212 from the container 80, thereby releasing the container. Alternatively, the loading/unloading mechanism 210 may be configured so that the bar 212 is driven downwardly, out of engagement with the notch 88.

Additionally, since the system 10 includes an array of storage locations 50 adjacent the front side of the track 110 and a second array of storage locations adjacent the rear side of the track, the loading/unloading mechanism 210 is operable to retrieve and store items in the forward array and the rearward array. Specifically, as shown in FIG. 3, the loading/unloading mechanism 210 includes two bars spaced apart from one another. One bar is operable to engage containers in the forward array, while the second bar is operable to engage containers in the rearward array of storage locations.

The vehicle 200 may include four wheels 220 that are used to transport the vehicle along the track 110. The wheels 220 may be mounted onto two parallel spaced apart axles 215, so that two of the wheels are disposed along the forward edge of the vehicle and two of the wheels are disposed along the rearward edge of the vehicle.

The vehicle 200 may include an onboard motor for driving the wheels 220. More specifically, the drive motor may be operatively connected with the axles to rotate the axles 215, which in turn rotates the gears 222 of the wheels. The drive system for the vehicle 200 may be configured to synchronously drive the vehicle along the track 110. In the present instance, the drive system is configured so that each gear is driven in a synchronous manner.

The vehicle 200 may be powered by an external power supply, such as a contact along the rail that provides the electric power needed to drive the vehicle. However, in the present instance, the vehicle includes an onboard power source that provides the requisite power for both the drive motor and the motor that drives the load/unload mechanism 210. Additionally, in the present instance, the power supply is rechargeable. Although the power supply may include a power source, such as a rechargeable battery, in the present instance, the power supply is made up of one or more ultracapacitors. The ultracapacitors can accept very high amperage to recharge the ultracapacitors. By using a high current, the ultracapacitors can be recharged in a very short time, such as a few seconds or less.

The vehicle includes one or more contacts for recharging the power source. In the present instance, the vehicle includes a plurality of brushes, such as copper brushes that are spring-loaded so that the brushes are biased outwardly. The brushes cooperate with a charging rail to recharge the power source.

Each vehicle may include a load sensor for detecting that an item is loaded onto the vehicle. The sensor(s) may be used to detect whether the item is properly positioned on the vehicle. For instance, the load sensor may include a force detector detecting a weight change or an infrared sensor detecting the presence of an item.

The vehicle 200 may further include a processor for controlling the operation of the vehicle in response to signals received from a central processor of the system. Additionally, the 200 vehicle may include a wireless transceiver so that the vehicle can continuously communicate with the central processor as it travels along the track 110. Alternatively, in some applications, it may be desirable to incorporate a plurality of sensors or indicators positioned along the track. The vehicle may include a reader for sensing the sensor signals and/or the indicators, as well as a central processor for controlling the operation of the vehicle in response to the sensors or indicators.

Pick Station and Track

As described previously, the system 10 may be configured so that the vehicles 200 retrieve items from the storage locations 50 and transport the items to the pick station 300. Referring now to FIGS. 1-2 the pick station 300 will be described in greater detail.

In one mode of operation, the system 10 is used to retrieve items needed to fill an order. The order may be an internal order, such as parts needed in a manufacturing process in a different department, or the order may be a customer order that is to be filled and shipped to the customer. Either way, the system 10 automatically retrieves the items from the storage areas 50 delivers the items to the picking station 300 so that an operator can pick the required number of an item from a container 80. After the item is picked from a container 80, the vehicle 200 advances so that the next item required for the order is advanced. The system 10 continues in this manner so that the operator can pick all of the items needed for an order.

In the present instance, the pick station 300 is positioned at one end of the array of storage locations. However, it may be desirable to incorporate multiple pick stations positioned along the track 110. For instance, a second pick station can be positioned along the opposite end of the array of storage locations. Alternatively, multiple pick stations can be provided at one end. For instance, a second pick station may be positioned above a first pick station at one end of the aisle.

The pick station 300 may be configured so that the vehicle 200 travels upwardly to present the contents to the operator so that the operator can more easily retrieve items from the container 80. Referring to FIGS. 1-2, at the picking station 300 the track 110 includes a curved section 315 that bends upwardly and away from the operator. In this way, the vehicle 200 moves upwardly and then stops at a height that facilitates the operator removing items from the container 80. After the operator removes items from the container 80, the vehicle 200 moves laterally away from the operator and then vertically to the upper horizontal rail 135.

The system 10 can be configured so that the vehicles 200 tilt at the pick station 300 thereby making it easier for the operator to retrieve items from the container 80. For instance, as the vehicle 200 approaches the pick station 300, the controller may control the vehicle so that the rearward set of wheels 220 continue to drive after the forward set of wheel stop. This raises the rearward edge of the vehicle (from the perspective of the operator). After the operator picks the items from the container, the forward set of wheels (relative to the operator) drive first, thereby leveling off the vehicle. Once leveled, the four wheels 220 drive synchronously.

Although the vehicles 200 may be tilted by controlling operation of the vehicles, if the wheels of the vehicles positively engage drive elements in the track 110, such as the toothed wheels 220 that mesh with teeth 156 in the track as described above, the wheels 220 may bind if the rear wheels are driven at a different rate than the forward wheels. Accordingly, the track system 110 may be modified so that the track moves to tilt the container toward the operator.

Referring to FIGS. 1 and 2, the details of the track system in the picking station 300 will be described in greater detail.

At the end of the columns of storage locations, the track curves outwardly away from the vertical columns of the system to form the curved track 315 of the pick station 300. The track sections of the pick station include parallel forward track sections that support and guide the forward axle 215 of the vehicles 200 and parallel rearward track sections that support and guide the rear axle 215 of the vehicles. The forward track sections extend vertically upwardly and then curve back toward the vertical columns of storage locations. The rearward track sections are substantially parallel to the forward track sections and curve substantially similarly to the forward track sections. In this way, the forward and rearward track sections guide the vehicles so that the vehicles can maintain a substantially horizontal orientation as the vehicles are driven along the curved track 315.

The rearward track sections may be configured so that the rearward axle of the vehicle 200 can be lifted while the vehicle is stopped at the pick station 300. By lifting the rearward axle of the vehicle 200, the container on the vehicle is tilted to present the contents of the container to the operator to facilitate the picking process.

The pick station 300 may include a plurality of items to improve the efficiency of the pick station. For instance, the pick station may include a monitor to display information to aid the operator. As the vehicle approaches the pick station, the system 10 may display information such as how many items need to be picked from the container for the order. Additionally, since the operator may pick items for multiple orders, the system may display which order(s) the item is to be picked for, in addition to how many of the item are to be picked for each order. The system may also display information such as how many items should be remaining in the container after the operator picks the appropriate number of items from the container.

One feature of the system 10 as described above is that the orientation of the vehicles 200 does not substantially change as the vehicles move from travelling horizontally (along the upper or lower rails 135, 140) to vertically (down one of the columns 130). Specifically, when a vehicle 200 is travelling horizontally, the two front geared wheels 220 cooperate with the upper or lower horizontal rail 135 or 140 of the front track 115, and the two rear geared wheels 220 cooperate with the corresponding upper or lower rail 135 or 140 of the rear track 120. As the vehicle passes through a gate 180 and then into a column, the two front geared wheels engage a pair of vertical legs 130 in the front track 115, and the two rear geared wheels engage the corresponding vertical legs in the rear track 120. It should be noted that when it is stated that the orientation of the vehicles relative to the horizon does not change, this refers to the travel of the vehicles around the track 110. Even though the vehicles may tilt relative to the horizon at the picking station 300, the vehicles are still considered to remain in a generally constant orientation relative to the horizon as the vehicles travel along the track 110.

As the vehicle travels from the horizontal rails to the vertical columns or from vertical to horizontal, the tracks allow all four geared wheels to be positioned at the same height. In this way, as the vehicle travels along the track it does not skew or tilt as it changes between moving horizontally and vertically. Additionally, it may be desirable to configure the vehicles with a single axle. In such a configuration, the vehicle would be oriented generally vertically as opposed to the generally horizontal orientation of the vehicles described above. In the single axle configuration, the weight of the vehicles would maintain the orientation of the vehicles. However, when using a single axle vehicle, the orientation of the storage locations would be re-configured to accommodate the vertical orientation of the vehicles.

Operation

Once the central controller determines the appropriate storage location 50 for the item, the route for a vehicle 200 leaving the pick station 300 may be determined. Specifically, the central controller may determine the route for the vehicle 200 and communicate information to the vehicle regarding the storage location 50 into which the item is to be delivered. The central controller may then control the operation of the vehicle 200 actuate gates 180 along the track 110 necessary to direct the vehicle to the storage location 50 into which the item is to be delivered. Once the vehicle 200 reaches the appropriate storage location, the vehicle stops at the storage location 50 and the container is displaced into the appropriate storage location. For example, the vehicle may be stopped at the appropriate storage location 50 and the onboard controller on the vehicle may send an appropriate signal to the vehicle to drive the chain 214, which advances the bar 212. Since the bar 212 is engaged in the slot 88 in the container 80, the bar drives the container off the vehicle 200 and into the appropriate storage location.

After discharging the item, the vehicle 200 may travel to a second storage location 50 to retrieve the next item to be transported to the picking station 300. After retrieving the item, the vehicle 200 may travel down the vertical legs 130 of the column until it reaches the lower rail 140. Gates 180 may direct the vehicle along the lower rail, and the vehicle may follow the lower rail 140 to return to the pick station 300 to deliver another item.

If the vehicle 200 delivers a container 80 to an empty storage location 50, then the operation of the vehicle proceeds as described above. Similarly, if the vehicle 200 retrieves a container 80 that is not connected with another container, then the operation of the vehicle proceeds as described above. In particular, the vehicle stops adjacent the container. The loading/unloading mechanism 210 advances into engagement with the container 80 and then the loading/unloading mechanism pulls the container onto the vehicle 200. In contrast, the operation of the vehicle 200 is modified if the vehicle 200 carries a container 80 to be placed into a storage location 50 that already contains a container. Similarly, the operation of the vehicle 200 is modified if the vehicle is retrieving a container 80 attached to a container in a remote storage location 57.

Referring now to FIGS. 9 and 10A-10H, the operation of a vehicle 200 retrieving a container 80 from a storage location 50 having "n" deep containers will be described. FIG. 9 illustrates an exemplary embodiment in which two racks 35, 40 of storage containers 80 are illustrated. The racks 35, 40 are separated from one another by an aisle and the vehicle 200 travels within the aisle between the racks. In the illustrated embodiment, the rack includes storage locations 50 that have a depth sufficient to store two storage containers 80. The portion of the storage location that accommodates the storage container adjacent the aisle is referred to in this discussion as the inner cell and is designated 55. The portion of the storage location behind the inner cell 55 is referred to as the remote cell and is designated 57.

In the illustrated embodiment, each container 80 includes a front connector 92 connected to the front end of the container and a rear connector 96 connected to a rear end of the container. The front connector 92 of the container 80 in the remote cell connects 57 with rear connector 96 of the container 80 in the inner cell 55 to create a releasable connection designated 90.

In FIG. 9, storage container 80A is stored in a remote cell 57 behind storage container 80B that is stored in an inner call 55. Containers 80A, 80B are releasably connected to one another by a connector, such as connector 90. The containers 80A, 80B are generally aligned from a horizontal perspective. The vehicle 200 is stopped at a position adjacent the storage location that houses container 80A. The vehicle 200 is empty (i.e. no container is loaded on the vehicle). The load/unload mechanism 210 engages the container 80A as shown in FIG. 9. For example, as shown in FIGS. 11 and 12, the front edge of the container 80 may extend into the aisle beyond the track (e.g. vertical track sections 130). In particular, the transfer groove 88 of the container 80 may extend into the aisle. The load bar 212 extends outwardly toward the container, away from the platform of the vehicle until the load bar is inserted into the transfer groove 88.

Figure 10A:
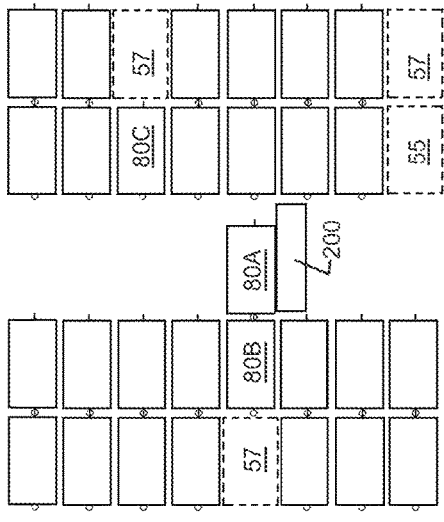
FIG. 10A is a diagrammatic view of the storage containers illustrated in FIG. 9, showing a step in the process of moving a storage container from one location to another.

Referring to FIG. 10A, the load mechanism pulls the container 80A onto the vehicle 200. As the container 80A in the inner cell is pulled onto the vehicle, the container 80A pulls the container 80B in the remote cell toward the inner cell. In particular, the connector 90 connects the inner and remote containers 80A, 80B so that the containers move horizontally together.

Figure 10B:
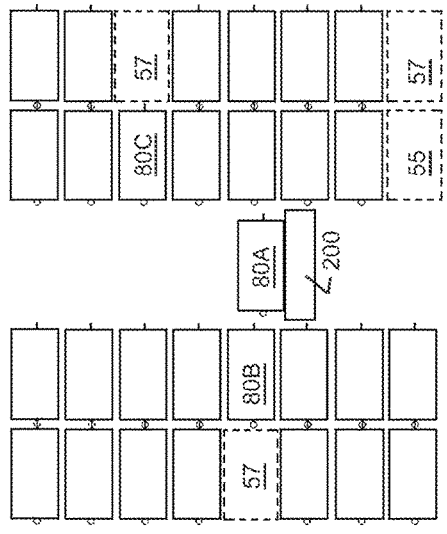
FIG. 10B is a diagrammatic view of the storage containers illustrated in FIG. 9, showing a step in the process of moving a storage container from one location to another.

Referring to FIG. 10B, the vehicle 200 continues to displace the container 80A onto the platform of the vehicle until the container is clear of the container in the storage location above the container. The displacement of container 80A pulls the remote container 80B into the inner cell 55 so that container 80B has taken the place that container 80A had in the rack. It can be seen in FIG. 10B that by pulling container 80B into the inner cell, the remote cell 57 behind container 80B is now vacant.

As described above, the loading mechanism 210 of the vehicle loads the inner container 80A onto the vehicle, which in turns displaces the remote container 80B horizontally until the remote container is moved into a different storage location, which in this instance is an inner cell 55. Continued displacement of the container 80A onto the vehicle would pull container 80B into the aisle and potentially onto the vehicle because the two containers remain connected. Accordingly, once the container 80B is displaced into the new storage location (i.e. the inner cell), the releasable connection 90 disconnects to thereby disconnect the two containers 80A, 80B.

Containers 80A, 80B may be disconnected in a variety of ways, depending on the mechanism that interconnects the containers. As noted previously, the connectors 92, 96 may be any of a variety of connectors that provide a releasable connection between two containers. The connectors may be mechanical or electro-mechanical. For example, the connectors 92, 96 could be magnetic elements, one of which may comprise an electro-magnet. The electro-magnet may be de-energized to disconnect the containers to facilitate relative motion of the first container relative to the second container. Alternatively, as described above, the connectors 92, 96 may be mechanical connectors, such as a pair of hooks or a tongue and groove arrangement. Accordingly, to disconnect the containers 80A, 80B, the connectors 92, 96 are disengaged. In one embodiment, the connectors 92, 96 are disengaged by displacing one of the containers vertically relative to the other container.

Figure 10C:
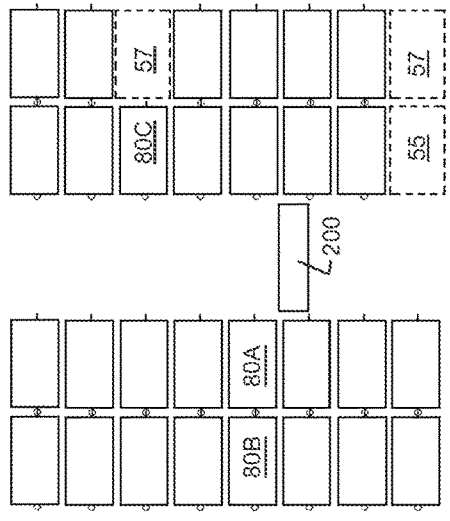
FIG. 10c is a diagrammatic view of the storage containers illustrated in FIG. 9, showing a step in the process of moving a storage container from one location to another.

Referring to FIG. 10C, once the first container 80A is loaded onto the vehicle so that the container 80A is clear of the containers immediately above it or below it in the column, the container 80A is displaced vertically to disconnect container 80A from container 80B. As shown in FIGS. 13-14, the tongue 94B of connector 92B may project downwardly into the groove 98A of connector 96A. Therefore, the vehicle moves downwardly to vertically displace container 80A downwardly until the tongue 94B of connector 92B disengages the groove 98A as shown in FIG. 14. In this way, displacing the vehicle 200 vertically disconnects container 80A from container 80B. It should be understood, that the connectors 92, 96 may be configured differently so that the connectors are disconnected by moving the vehicle upwardly, rather than lowering the vehicle.

Figure 10D:
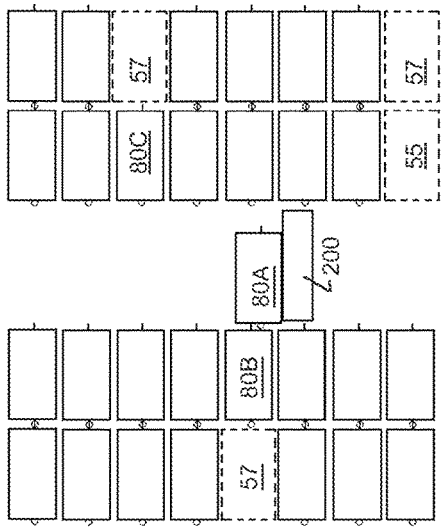
FIG. 10D is a diagrammatic view of the storage containers illustrated in FIG. 9, showing a step in the process of moving a storage container from one location to another.
Figure 10E:
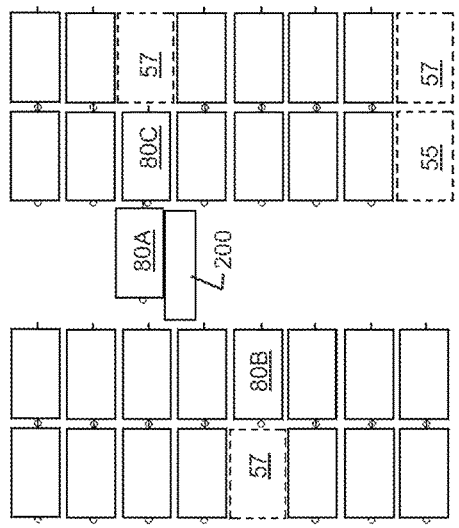
FIG. 10E is a diagrammatic view of the storage containers illustrated in FIG. 9, showing a step in the process of moving a storage container from one location to another.

Referring now to FIG. 10D, after the first container 80A is disconnected from the second container 80B, the first container 80A is displaced horizontally on the vehicle 200 away from the second container. The first container 80A is displaced horizontally until is centered within the aisle such that the container is clear from interfering or engaging any of the vehicles in the rack when the vehicle moves vertically upwardly or downwardly in the column. Once the container 80A is completely loaded onto the vehicle 200, the vehicle may advance toward the picking station 300 or other transfer location or to a different storage location. For example, the vehicle may move down to the lower horizontal rail 140 and then along the lower horizontal rail to deliver container 80A to the picking station 300. Alternatively, the container 80A may be transported to another storage location 50 and unloaded into the storage location.

The details of the steps of unloading the container 80A on vehicle 200 into a storage location in which a third container designated 80C is located are described below in connection with FIGS. 10E-10H. The vehicle 200 moves into position adjacent an inner cell 55 in rack 40 in which container 80C is stored. The container 80A is unloaded from the vehicle 200 toward the third container 80C. As the container 80A is unloaded, the container 80A pushes the third container 80C deeper into the storage location in the rack 40. Doing so displaces container 80C horizontally from the inner cell 55 into the remote cell 57. During the process of unloading the first container 80A and displacing container 80C, the first container 80A is connected to the third container 80C. As described previously, the connectors of the two containers may be connected in a variety of ways. In the present instance, the containers are connected by moving one of the containers relative to the other. Specifically, the first container 80A is displaced vertically relative to the third container 80C to connect the two containers.

Figure 10F:
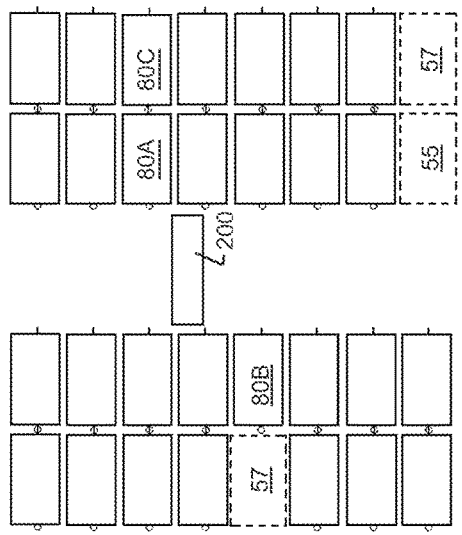
FIG. 10F is a diagrammatic view of the storage containers illustrated in FIG. 9, showing a step in the process of moving a storage container from one location to another.
Figure 10G:
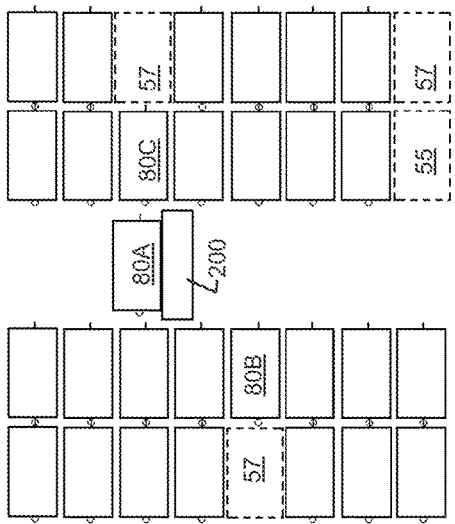
FIG. 10G is a diagrammatic view of the storage containers illustrated in FIG. 9, showing a step in the process of moving a storage container from one location to another.

Referring again to FIGS. 10E, to unload the first container 80A, the vehicle 200 is displaced along the track until the first container 80A is disposed vertically higher than the third container 80C. In particular, the vehicle 200 is driven to a position adjacent the container 80C so that the front connector of the first container 80A is positioned above the rear connector of the third container 80C. The first container 80A is then displaced horizontally toward the third container 80C to partially unload the container from the vehicle 200, as shown in FIG. 10F. In the present instance, the first container 80A is displaced until the front connector of the first container is aligned with the rear connector of the third container 80C. In particular, the unloading mechanism 210 of the vehicle displaces the container 80A horizontally until the tongue 94 of the front connector 92 is aligned with the groove 98 of the rear connector 96 on the third container 80C.

Figure 10H:
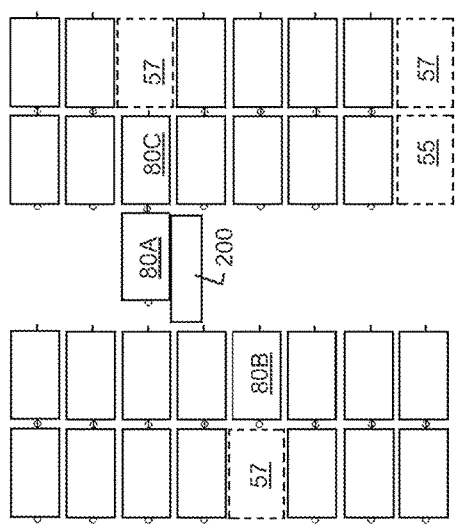
FIG. 10H is a diagrammatic view of the storage containers illustrated in FIG. 9, showing a step in the process of moving a storage container from one location to another.

Once the connectors of container 80A and 80C are aligned, the vehicle moves vertically to connect the containers. Specifically, referring to FIG. 10G, the vehicle moves downwardly to horizontally align containers 80A and 80C and to interconnect the two containers. Once the first container 80A is aligned horizontally with the storage location, the first container is unloaded from the vehicle into the storage location as shown in FIG. 10H. For instance, in the present embodiment, the loading/unloading mechanism of the vehicle drives the first container 80A off of the vehicle and into the inner cell in which the third container 80C was located. As the first container is driven into the inner cell, the first container 80A pushes the third container 80C deeper into the storage location so that the third container is moved into the remote cell (designated 57 in FIG. 10G).

As described above, the first container 80A is moved into position adjacent the third container 80C. The two containers are then connected before unloading the first container into the storage rack. In this way, the containers are linked so that subsequently, the third container in the remote cell can be pulled toward the aisle when the first container 80A is retrieved (see e.g. FIGS. 10A-10D and description above). However, it should be appreciated that the containers do not need to be connected in order to unload the first container and move the third container into the remote cell. Specifically, since the first container 80A pushes the third container 80C rearwardly into the rear cell, the containers do not need to be connected prior to unloading the first container. Therefore, depending on the configuration of the front and rear connectors, the containers may be connected to one another after the first container is unloaded from the vehicle.

Accordingly, as described above, the system 10 may be configured to incorporate multi-depth storage locations in which containers 80 are stored behind one another in a common horizontal storage location 50. The containers in a common horizontal storage location may be interconnected so that retrieving one of the containers in the common storage location displaces the other containers in the common storage location forwardly toward the vehicle 200. In the above description, the operation has been described in which a first container 80A is loaded onto a delivery vehicle, thereby pulling a container 80B from a remote cell 57 into an inner cell 65 so that the container 80B can be retrieved from the inner cell 55. The vehicle can then deliver the first container 80A to a different storage locations and then return to retrieve the second container 80B that was displaced into the inner cell 55. Alternatively, in certain instances, a storage location housing two containers (such as containers 80A and 80B shown in FIG. 9) may be located across from an open storage location vertically and horizontally aligned with the two containers. In such an instance, the first container 80A may be loaded onto the vehicle 200, thereby pulling the second container 80B toward the vehicle. Rather than disconnecting the two containers as described above, the first container 80A is further displaced horizontally to unload the container into a storage location in the opposing rack. As the first container 80A is unloaded into the storage location, the second container 80B is pulled onto the vehicle. The second container 80B can then be disconnected from the first container 80A so that the vehicle 200 can deliver the second container to the picking station 300 or a different storage location. For instance, the vehicle can be displaced vertically to disconnect the second container 80B from the first container 80A.

In the foregoing description, a system 10 is described in which containers are stored in multi-depth storage locations 50. A container 80B in a remote cell 57 of a multi-depth storage location 50 may be retrieved by a vehicle 200 first retrieving a container 80A that is in front of the container 80B in the remote cell. The retrieved container 80A is then transported away by the vehicle 200. The retrieved container 80A may then be stored in a different location so that the vehicle 200 can return to retrieve the container 80B that was located in the remote cell 57. Alternatively, a first vehicle may retrieve the container 80A that is in front of the container 80R in the remote cell 57 and a second vehicle may come and retrieve the container 80B that was located in the remote cell.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A container for use in a material handling system for storing or retrieving a plurality of items, wherein the material handling system includes a vehicle for delivering and retrieving items, and the vehicle comprises an on-board motor for driving the vehicle to one of a plurality of storage locations spaced apart vertically and horizontally from one another, wherein the vehicle includes a transfer mechanism for transferring items between the vehicle and the storage areas, wherein the container comprises:
   a bottom having an upper surface for supporting one or more items;
   a front wall projecting upwardly from the bottom surface;
   a rear wall projecting upwardly from the bottom surface;
   a first side wall extending between the front wall and the rear wall;
   a second side wall extending between the front wall and the rear wall;
   a first connector connected to the front wall;
   a second connector connected to the rear wall;
   a first transfer receptacle positioned adjacent the front wall wherein the first transfer receptacle is configured to mate with the transfer mechanism to displace the container horizontally;
   a second transfer receptacle positioned adjacent the rear wall, wherein the second transfer receptacle is configured to mate with the transfer mechanism to displace the container horizontally; and
   wherein the first and second connectors are configured to be connectable to form a releasable connection.

2. The container of claim 1 wherein the first receptacle comprises a groove having an opening facing downwardly away from the bottom surface.

3. The container of claim 2 wherein the second receptacle comprises a groove having an opening facing downwardly away from the bottom surface.

4. The container of claim 3 wherein the first connector comprises one of a first bracket having a flange projecting upwardly and a second bracket having a flange projecting downwardly.

5. The container of claim 4 wherein the second connector comprises the other of the first and second bracket.

6. The container of claim 1 wherein the first receptacle is positioned below the upper surface of the bottom.

7. The container of claim 6 wherein the second receptacle is positioned below the upper surface of the bottom.

8. The container of claim 7 wherein the first receptacle is positioned adjacent the first connector.

9. The container of claim 8 wherein the second receptacle is positioned adjacent the second container.

10. The container of claim 9 wherein the first receptacle comprises a groove having an opening facing downwardly away from the bottom surface.

11. The container of claim 10 wherein the transfer mechanism has a height, and the first receptacle has a height greater than the height of the transfer mechanism so that the height of the transfer mechanism completely nests within the first receptacle.

12. The container of claim 11, wherein the second receptacle has a height greater than the height of the transfer mechanism so that the height of the transfer mechanism completely nests within the second receptacle.

13. A combination of containers for use in a material handling system for storing or retrieving a plurality of items, wherein the material handling system includes a vehicle for delivering and retrieving items, and the vehicle comprises an on-board motor for driving the vehicle to one of a plurality of storage locations spaced apart vertically and horizontally from one another, wherein the vehicle includes a transfer mechanism for transferring items between the vehicle and the storage areas, wherein the combination comprises;
- a first container comprising a bottom having an upper surface for supporting one or more items;
  - a first wall projecting upwardly from the bottom surface;
  - a second wall projecting upwardly from the bottom surface;
  - a third wall extending between the first wall and the second wall;
  - a fourth wall extending between the first wall and the second wall;
  - a first connector connected to the first wall,
  - a second connector connected to the second wall;
  - a first transfer receptacle positioned adjacent the first wall wherein the first transfer receptacle is configured to mate with the transfer mechanism to displace the first container horizontally;
  - a second transfer receptacle positioned adjacent the second wall, wherein the second transfer receptacle is configured to mate with the transfer mechanism to displace the first container horizontally; and
- a second container comprising a second bottom having a second upper surface for supporting one or more items;
  - a fifth wall projecting upwardly from the second bottom surface,
  - a sixth wall projecting upwardly from the second bottom surface;
  - a seventh wall extending between the fifth wall and the sixth wall;
  - an eight wall extending between the fifth wall and the sixth wall;
  - a third connector connected to the fifth wall;
  - a fourth connector connected to the sixth wall;
  - a third transfer receptacle positioned adjacent the fifth wall wherein the third transfer receptacle is configured to mate with the transfer mechanism to displace the second container horizontally;
  - a fourth transfer receptacle positioned adjacent the sixth wall, wherein the fourth transfer receptacle is configured to mate with the transfer mechanism to displace the second container horizontally; and wherein the second connector of the first container is connectable with the third connector of the second container to connect the two containers such that horizontal displacement of the first container by the transfer mechanism displaces the second container.

14. The combination of claim 13 wherein the connection of the second connector of the first container and the third connector of the second container impedes horizontal displacement of the first container relative to the second container.

15. The combination of claim 14 wherein the connection of the second and third connectors is sufficient to support the weight of the second container during horizontal displacement such that displacing the first container horizontally displaces the second container horizontally when the second and third connectors are connected.

16. The combination of claim 15 wherein the connection of the second and third connectors permits vertical displacement of the first container relative to the second container.

17. The combination of claim 16 wherein the second and third connectors are configured such that displacement of the second connector of the first container vertically relative to the third connector of the second container disconnects the second connector of the first container from the third connector of the second container.

18. The combination of claim 13 wherein the first connector comprises a tongue and the second connector comprises a groove configured to receive the tongue.

* * * * *